US006947435B1

(12) United States Patent
Chikuma et al.

(10) Patent No.: US 6,947,435 B1
(45) Date of Patent: Sep. 20, 2005

(54) RADIO COMMUNICATION SYSTEM AND APPARATUS, COMMUNICATION METHOD AND PROGRAM RECORDING MEDIUM THEREFOR

(75) Inventors: Satoru Chikuma, Kanagawa (JP); Nobutsugu Fujino, Kanagawa (JP); Yuichiro Noguchi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/263,820

(22) Filed: Mar. 8, 1999

(30) Foreign Application Priority Data

May 22, 1998 (JP) .................................. 10-140649

(51) Int. Cl.[7] .......................... H04L 12/56; H04J 3/16; H04B 7/00; H04Q 7/28; H04Q 7/00
(52) U.S. Cl. ...................... 370/412; 370/409; 370/469; 370/310; 370/341; 370/329
(58) Field of Search ........................ 370/401, 465–466, 370/469, 310, 409, 230, 235, 229, 468, 412, 370/341, 328–329, 428, 429, 410; 709/203, 709/201, 200

(56) References Cited

U.S. PATENT DOCUMENTS

| 4,775,974 | A | * | 10/1988 | Kobayashi | .................. 370/231 |
| 5,519,699 | A | | 5/1996 | Ohsawa | ........................ 370/321 |
| 5,699,500 | A | * | 12/1997 | Dasgupta | ........................ 714/1 |
| 5,751,719 | A | * | 5/1998 | Chen et al. | .................. 370/473 |
| 5,822,523 | A | * | 10/1998 | Rothschild et al. | ......... 709/236 |
| 6,006,254 | A | * | 12/1999 | Waters et al. | ............... 709/205 |
| 6,078,961 | A | * | 6/2000 | Mourad et al. | ............. 709/235 |
| 6,091,733 | A | * | 7/2000 | Takagi et al. | ............... 370/401 |
| 6,094,418 | A | * | 7/2000 | Soumiya et al. | ............ 370/231 |
| 6,266,701 | B1 | * | 7/2001 | Sridhar et al. | ............... 709/232 |
| 6,430,409 | B1 | * | 8/2002 | Rossmann | ................ 455/422.1 |
| 6,490,248 | B1 | * | 12/2002 | Shimojo | ..................... 370/229 |

FOREIGN PATENT DOCUMENTS

| JP | 9-186739 | 7/1997 |
| JP | 9-219880 | 8/1997 |
| JP | 9-284211 | 10/1997 |

OTHER PUBLICATIONS

Bakre et al., IEEE Transactions on Computers, vol. 46, No. 3, pp. 260-278, "Implementation and Performance Evaluation of Indirect TCP", Mar. 1, 1997.*

(Continued)

*Primary Examiner*—Chi Pham
*Assistant Examiner*—Ronald Abelson
(74) *Attorney, Agent, or Firm*—Staas & Halsey LLP

(57) ABSTRACT

An apparatus for use in a radio communication system, comprising a monitoring unit which monitors whether or not a transmission request for data, designating the particular apparatus itself as a transmission destination, has been issued by the particular apparatus or another apparatus connected thereto through a network; a generation unit which operates when the monitoring unit has detected the issue of the transmission request, to generate a process to serve as a reception destination for the data and also to generate a buffer in correspondence with the process; a transfer unit which transfers the data from a transmission request source to the process in accordance with communications of virtual circuit type, so as to store the data in the buffer; and a transmission unit which transmits the data stored in the buffer, to the other apparatus through a radio channel. Thus, enhancement in the throughput of end-to-end data communications can be realized.

19 Claims, 35 Drawing Sheets

OTHER PUBLICATIONS

European Search Report for Appln No. EP 99 30 2160 dated Sep. 26, 2003.

Yosuke Tamura, et al., "Efficient Retransmit Scheme for TCP in Wireless LANs", Technical Report of IEICE CPSY98-36, pp. 71-77, May 7, 1998.

Ajay Bakre, et al., "Handoff and System Support for Indirect TCP/IP", Proceedings of the 2$^{nd}$ USENIX Symposium on Mobile and Location-Independent Computing, Apr. 1995.

Kevin Brown, et al., "M-TCP: for Mobile Cellular Networks", ACM Computer Communication Review, vol. 27(5), 1997.

Patent Abstracts of Japan vol. 1997, No. 12, Dec. 25, 1997 & JP 09 219880 Aug. 19, 1997.

Bakre A. V., et al., "Implementation and Performance Evaluation of Indirect TCP", IEEE Transactions on Computers, IEEE Inc. New York, US, vol. 46, No. 3, Mar. 1, 1997, pp. 260-278.

* cited by examiner

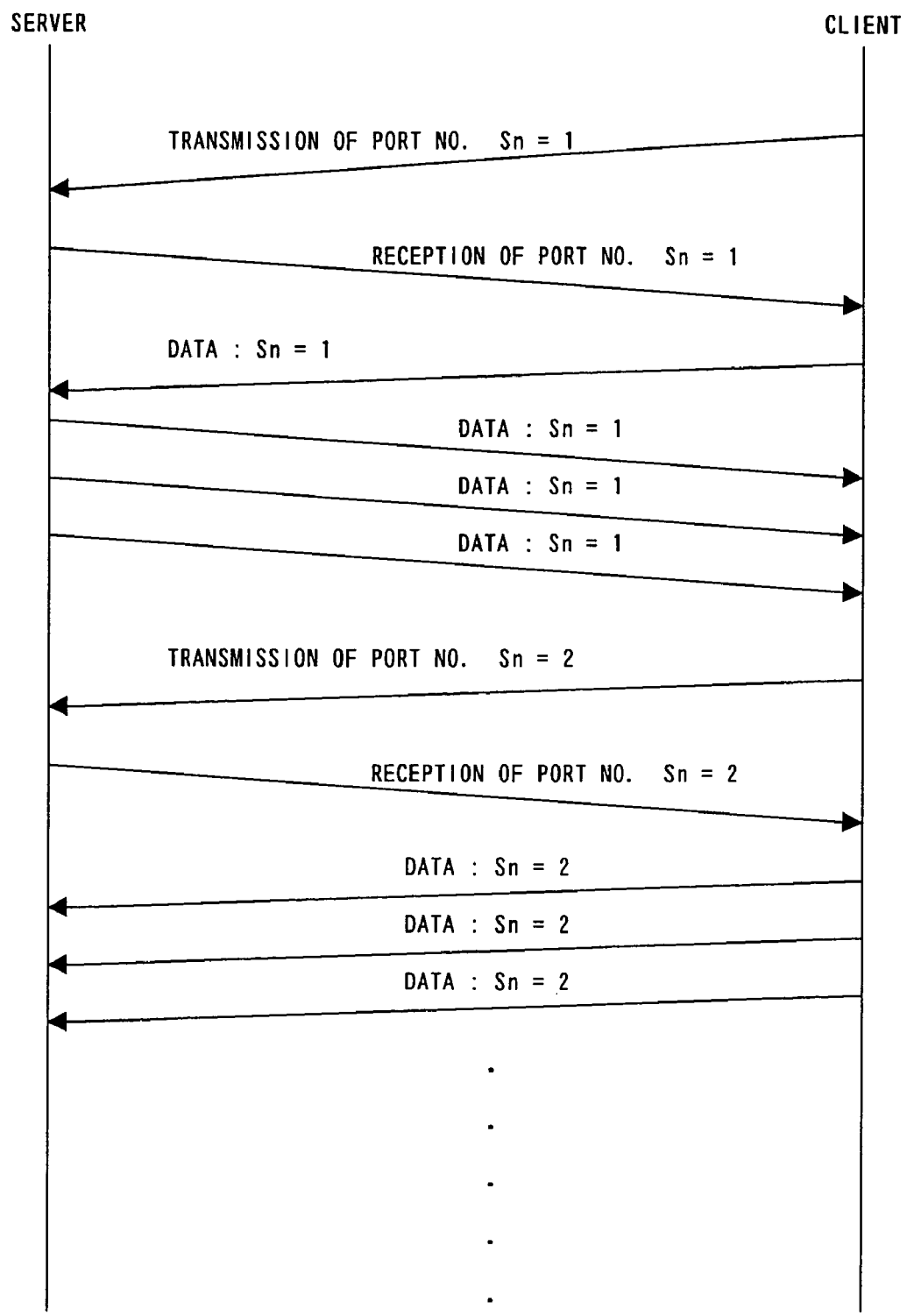
F I G. 4

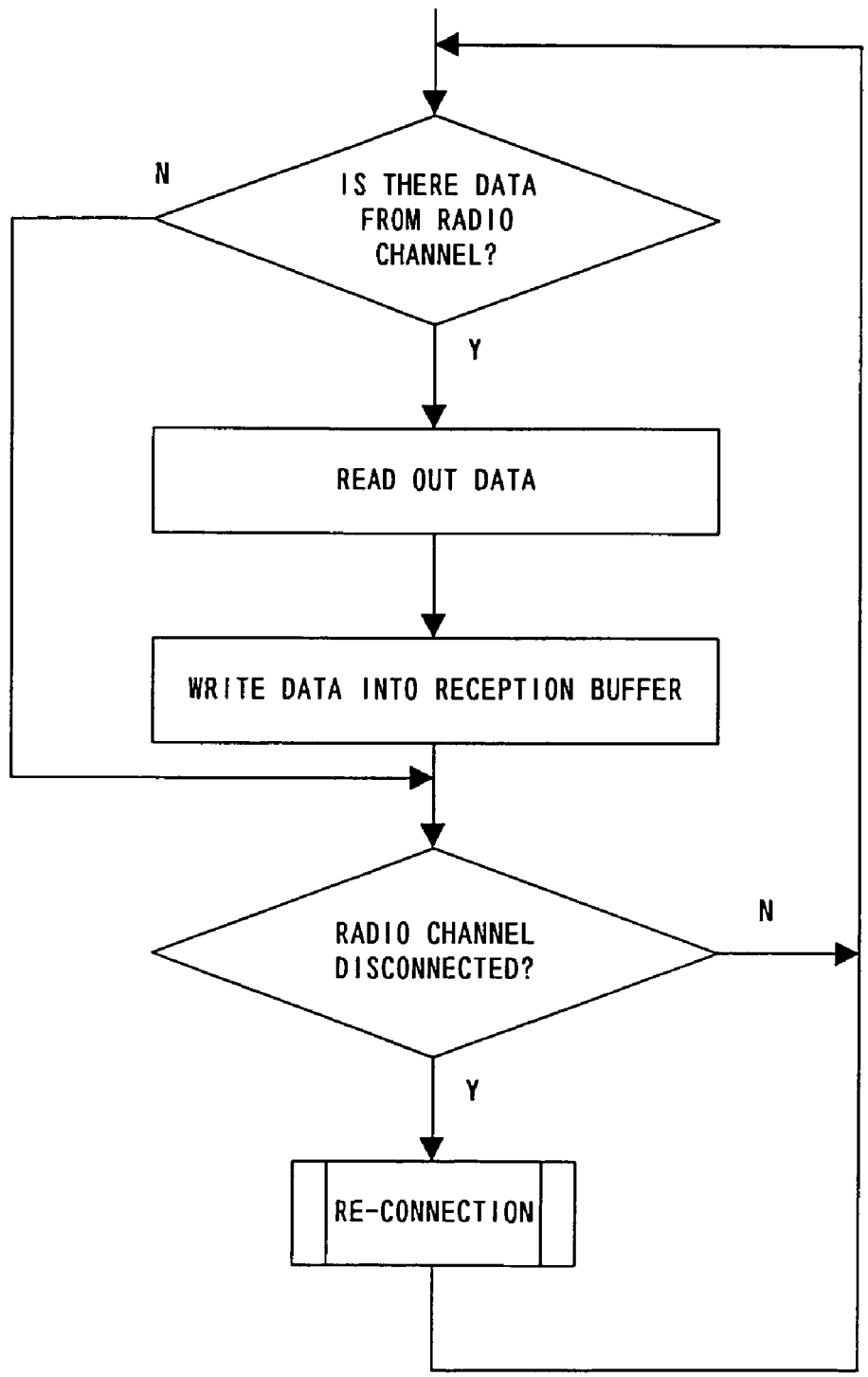
F I G. 8

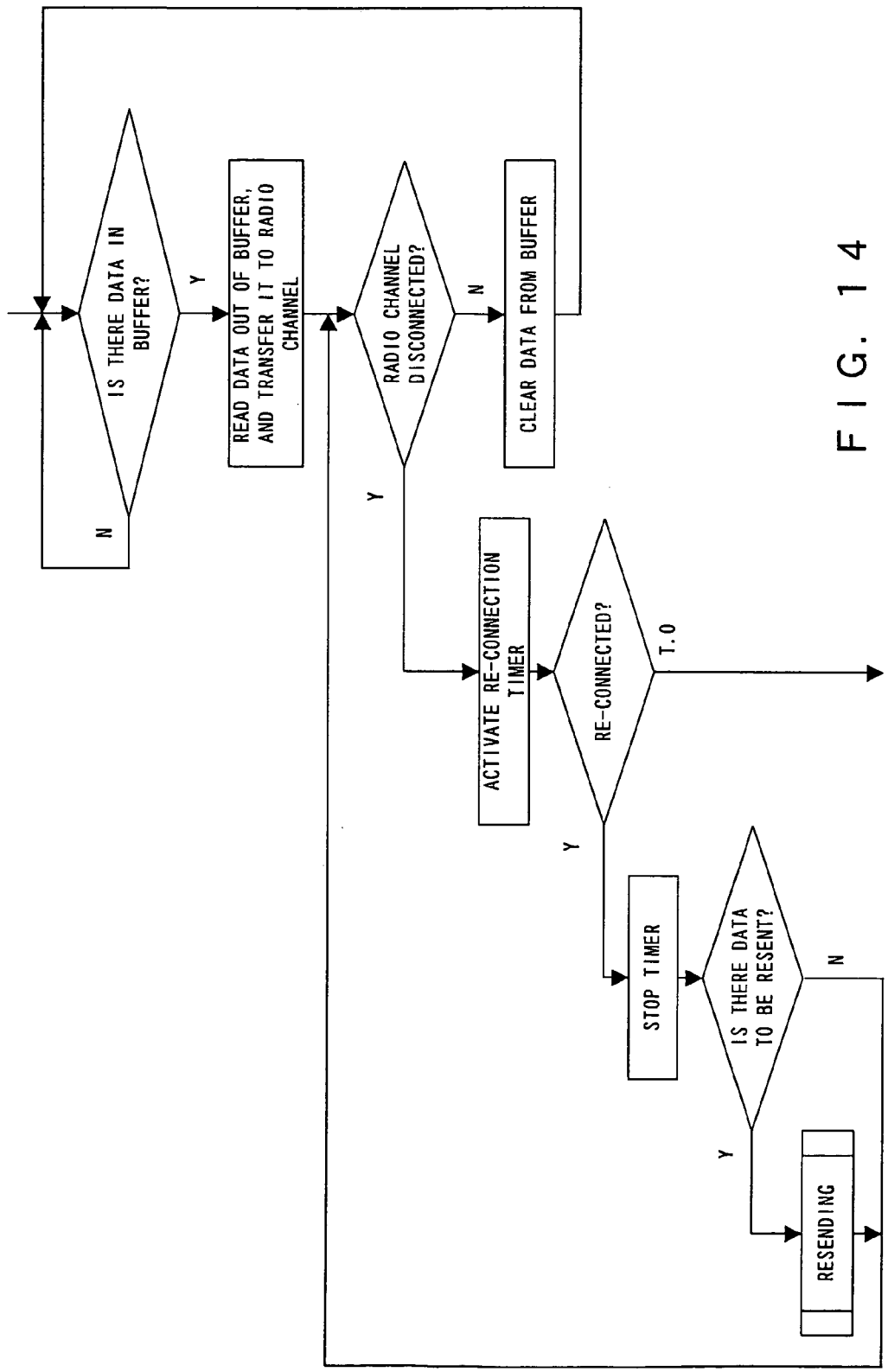
F I G. 14

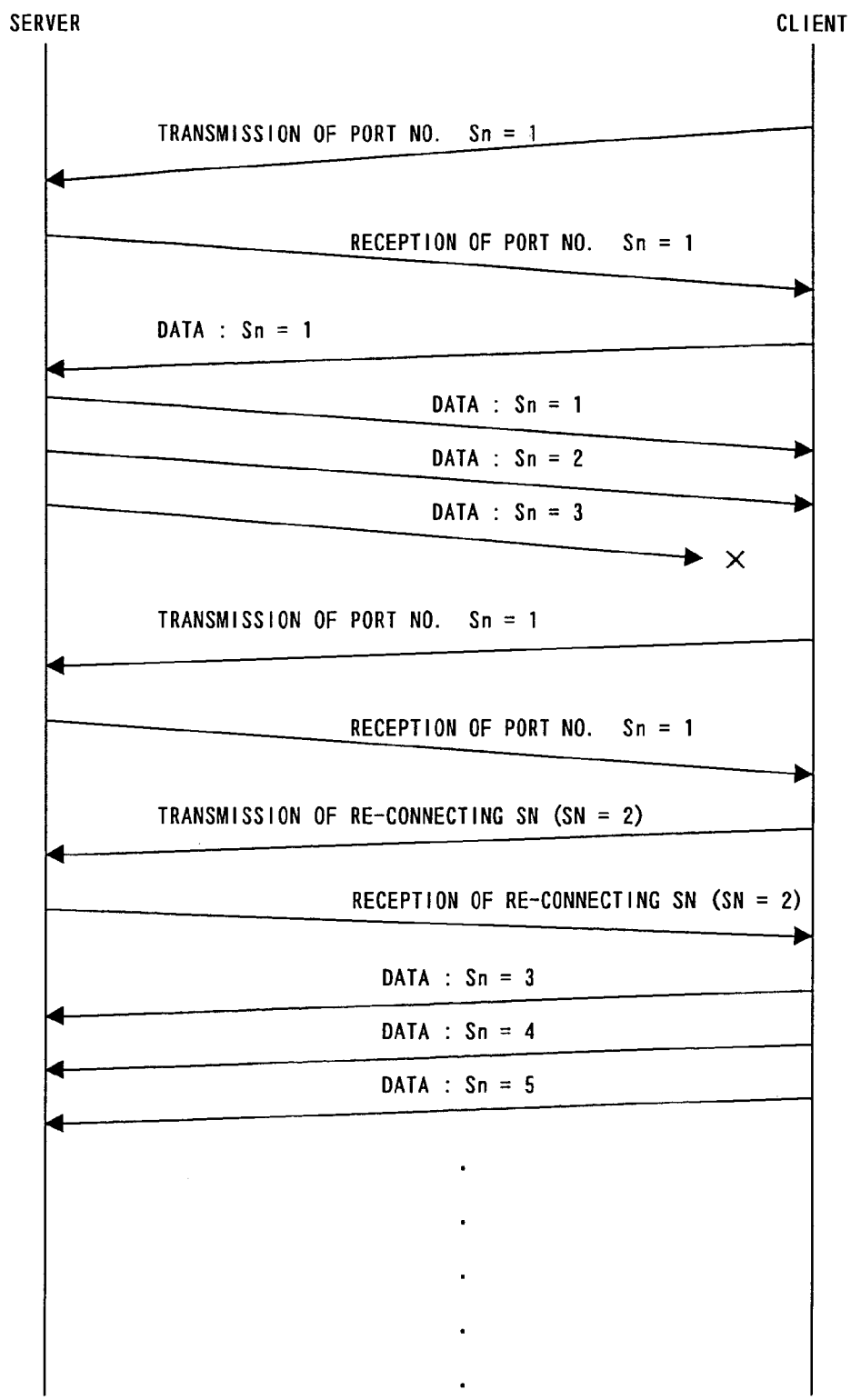
F I G. 19

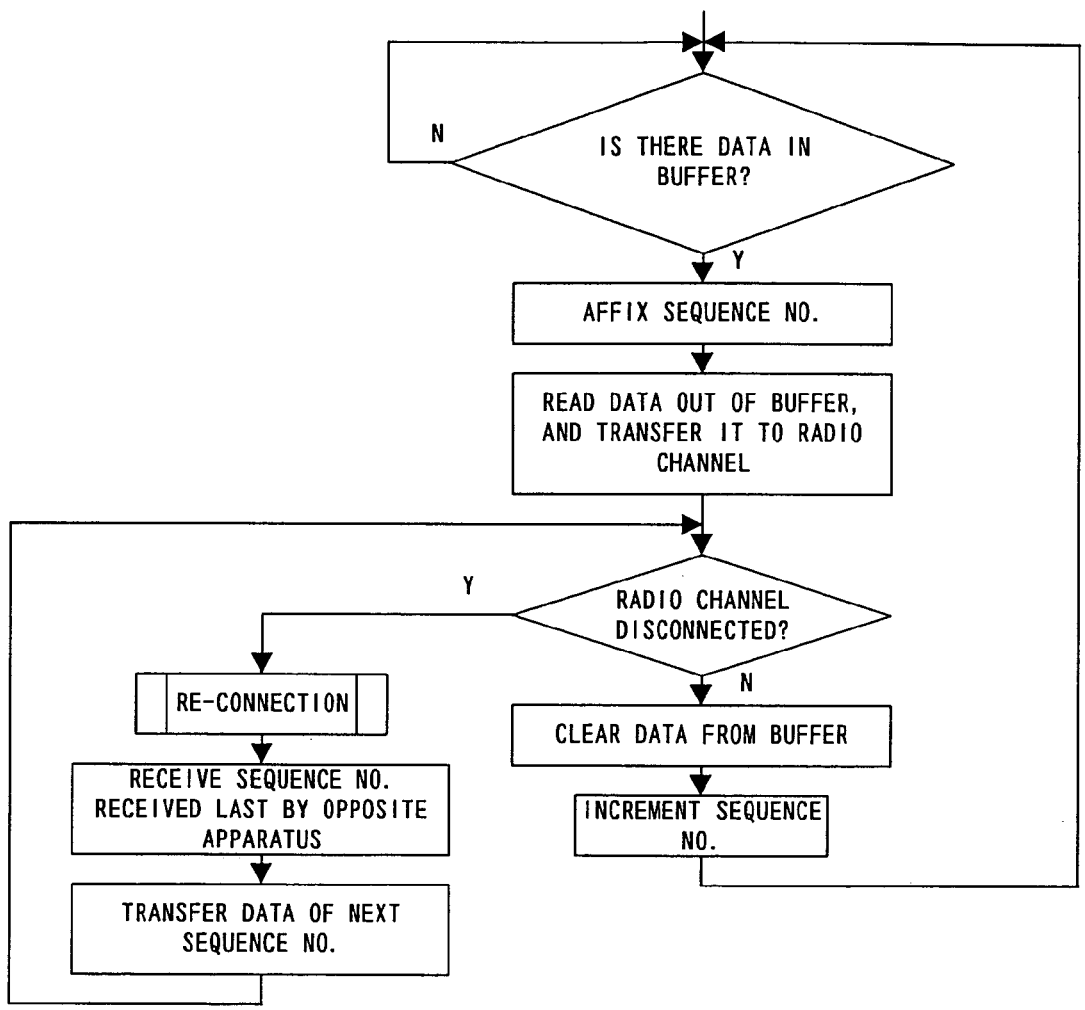
F I G. 2 1

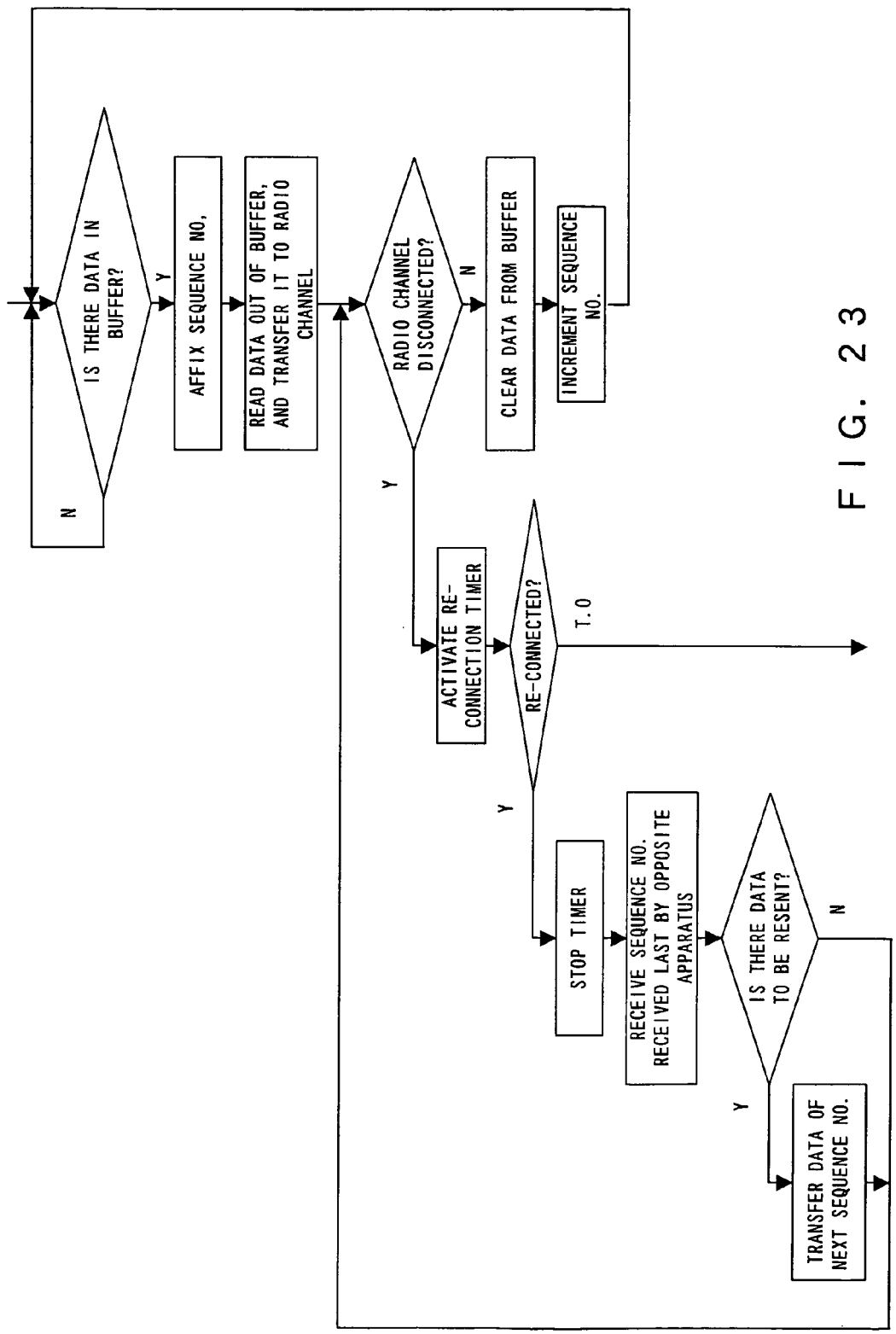
F I G. 23

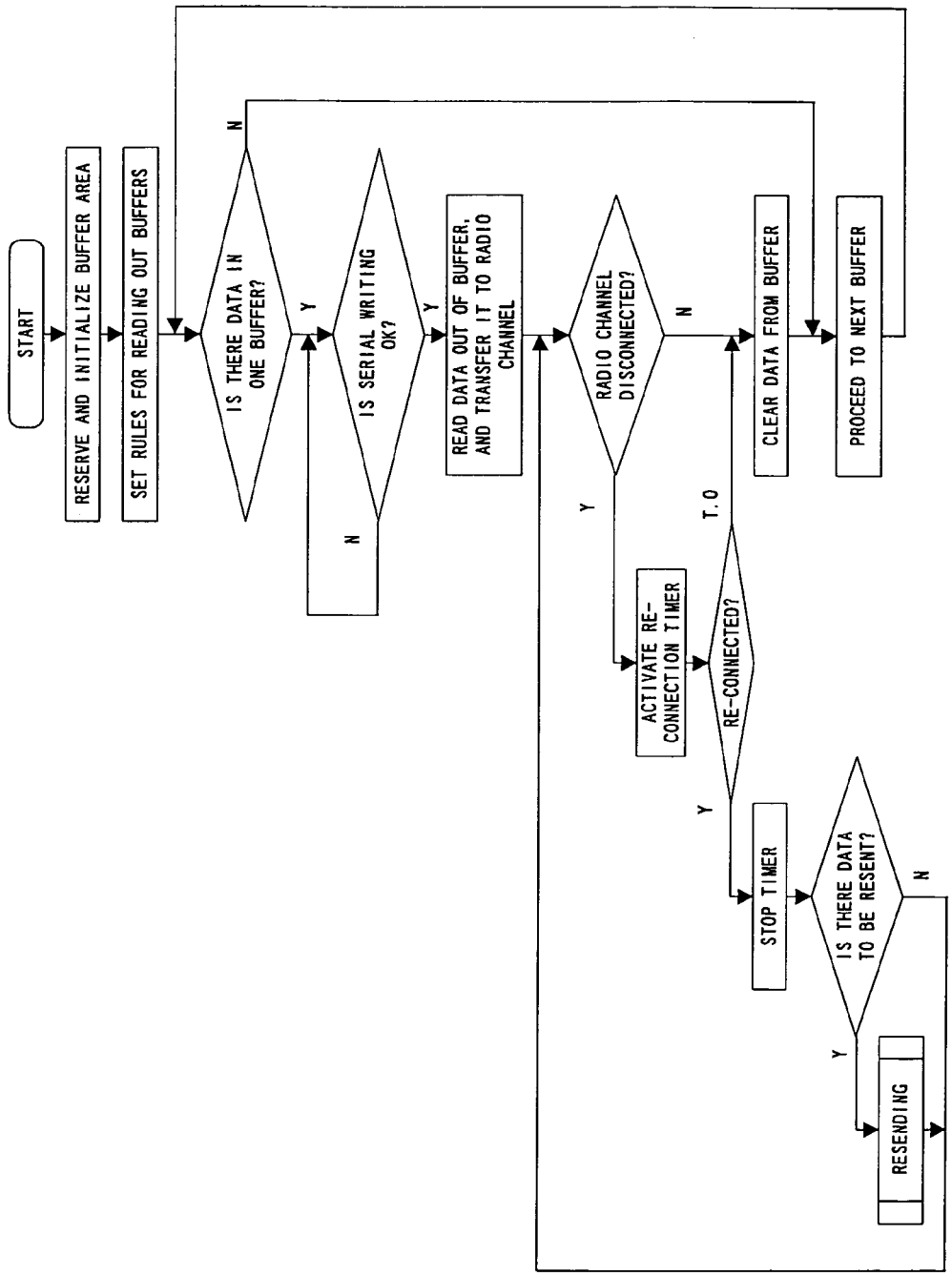
F I G. 2 7

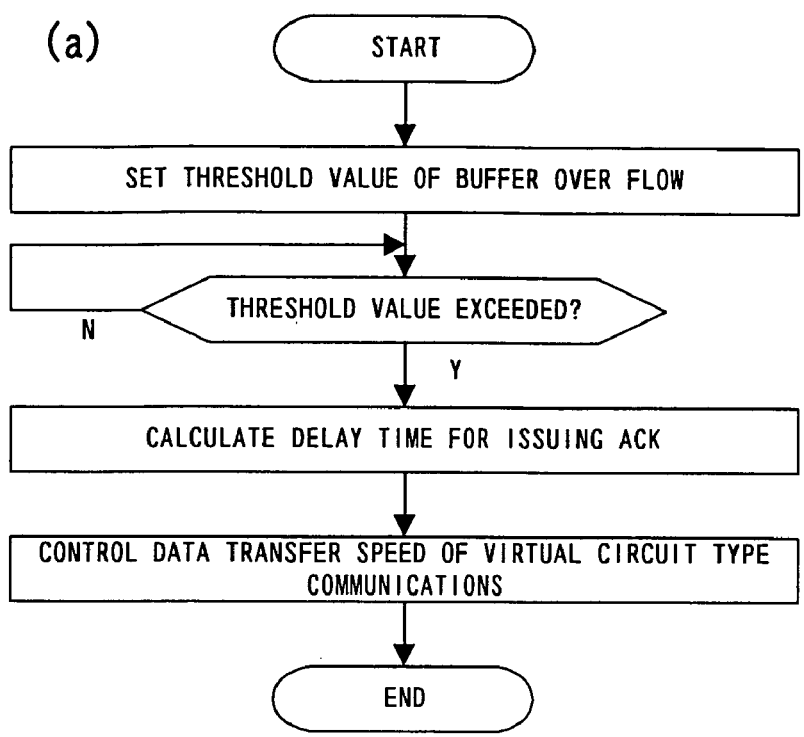
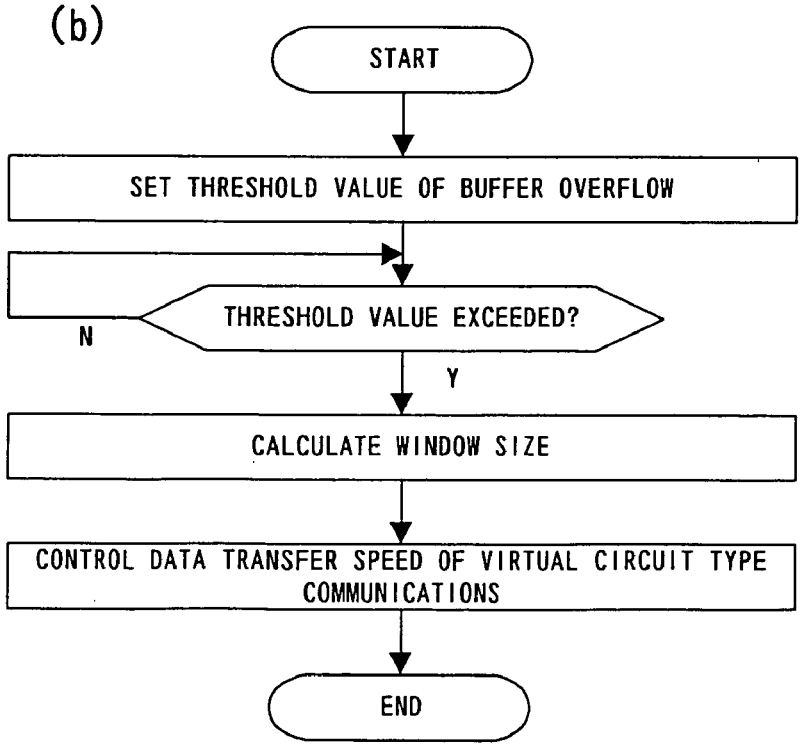
FIG. 29

RADIO COMMUNICATION SYSTEM AND APPARATUS, COMMUNICATION METHOD AND PROGRAM RECORDING MEDIUM THEREFOR

BACKGROUND OF THE INVENTION

1. Field of the Invention

The present invention relates to a radio communication system in which different apparatuses communicate through a radio channel, an apparatus as well as a communication method which is used in the radio communication system, and a program recording medium which stores therein programs for incarnating them. More particularly, it relates to a radio communication system which realizes enhancement in the throughput of end-to-end data communications, an apparatus as well as a communication method which is used in the radio communication system, and a program recording medium which stores therein programs for incarnating them.

2. Description of the Related Art

It has recently been common to have a portable terminal which is connected through a radio channel with a gateway connected to a public network, and which communicates with servers connected to the Internet, through the gateway.

In such case, the throughput of end-to-end data communications degrades inevitably because the radio channel is an unstable channel. Therefore the construction of technology which realizes enhancement in the throughput of end-to-end data communications has been called for.

In general, a computer network employs communications of virtual circuit type (connection type) wherein, as in telephony, a connection is first set for a desired node, data are subsequently transmitted to and received from the connected node, and the connection is thereafter cleared.

In communications of the virtual circuit type, controls such as a resending control, an error recovery control, a sequence control, a stream flow control and a congestion control are performed between communicating terminals (namely, between endpoint nodes). Thus, the reliability of the connection is guaranteed, and data in proper order can be obtained on the reception side without loss or change of transmitted information.

There has heretofore been adopted a structure as shown in FIG. 1A wherein, even when a radio channel intervenes between the communicating terminals, data are communicated therebetween in accordance with the virtual circuit type communications.

With such a prior-art technique, however, the throughput of the end-to-end data communications inevitably degrades greatly due instability of the radio channel.

More specifically, as illustrated in FIG. 1B, a resending control and an error control are performed as a mechanism for reliably transferring data to the opposite side, even in the protocol of the data link layer of the radio channel (composed of the two layers of a physical layer and the data link layer) separately from the protocol of an upper layer (for example, a transport layer).

In this case, when the TCP (Transmission Control Protocol), which is that transport layer protocol which is generally used in the Internet and which is mentioned as an example, the transmission node measures a round trip time (RTT) which is a time period required for a packet to go to and come back from the reception node, and it sets the time period of a timer for the resending control on the basis of the measured RTT. When a reception acknowledgement (ACK) is not received from the reception node within the set time period of the timer, the transmission node executes the processing of sending data again. Thus, the reliability of the data is guaranteed.

On this occasion, when the resending of a frame attributed to the protocol of the data link layer has occurred in the unstable radio channel existing between both the terminals, a time period for this resending is added to the time period of the resending timer in the TCP, so that a long time period is set for the timer. For this reason, in a case where a segment in the TCP has been lost, the resending is not immediately activated, and the throughput of the end-to-end data communications degrades greatly.

Further, according to the TCP, in the resending mode, congestion is regarded as the cause of the resending, and a slow start control is performed to suppressing the congestion. More specifically, a window control is ordinarily performed, in which a plurality of segment data is collectively sent in advance. In contrast, when the resending is to be initiated, the size of a window is set at the minimum unit so as to eliminate the cause of the congestion. Thereafter, the resending communications are started. Accordingly, the occurrence rate of ACKs (reception acknowledgements) increases more than in the stable state of the data communications, and the throughput of end-to-end data communications degrades greatly.

The official gazette of Japanese Patent Application Laid-open No. 219880/1997 (filed with and laid open by the Japanese Patent Office) discloses a technique as stated below. In consideration of the fact that radio channels are unstable ones, the technique adopts a construction wherein each of the mobile terminals and servers which constitute a radio communication system is furnished with a buffer memory. When the radio channels are changed over, or when the radio channel lies in a level status in which data communications are likely to be cut off, data to be sent out to the radio channel is temporarily stored in the buffer memory. After the radio channels have been changed over, or when the level status of the radio channel is restored, the data communications are restarted from the data stored in the buffer memory.

The known technique, however, does not take into consideration the protocol of an upper layer with respect to a data link layer. Therefore, when the resending control as in the TCP arises in a transport layer being the upper layer, the control acts in which a resending timer is set by adding a communicating time period in the radio channel. It is accordingly inevitable that the throughput of the end-to-end data communications degrades greatly.

SUMMARY OF THE INVENTION

The present invention has been made in view of such circumstances. It has for its object to provide, in adopting a construction in which different apparatuses communicate through a radio channel, an apparatus which is used in a novel radio communication system realizing enhancement in the throughput of end-to-end data communications, and a novel program recording medium which stores therein programs for incarnating the apparatus.

An apparatus according to the present invention comprises a monitoring unit, a generation unit, a transfer unit, a transmission unit and a reception unit.

In the first aspect of the present invention, the monitoring unit monitors whether or not a transmission request for data, designating the particular apparatus itself (in which this monitoring unit is included) as a transmission destination, has been issued by the particular apparatus or another apparatus connected thereto through a network. When the monitoring unit has detected the issue of the transmission request, the generation unit generates a process to serve as a reception destination for the data and also generates a buffer held in correspondence with the process. The transfer unit transfers the data from a transmission request source to the process in accordance with communications of virtual circuit type, so as to store in the buffer the data transferred from the request source. The transmission unit transmits the data stored in the buffer, to the other apparatus through a radio channel.

In the second aspect of the present invention, the reception unit receives data which has been sent in through the radio channel. The monitoring unit monitors whether or not the reception unit has received data which conforms to a protocol suspended or interrupted in the layers of the radio channel. When the monitoring unit has detected the reception of the pertinent data, the generation unit generates a process to serve as a reception destination for the data. The transfer unit transfers the data received by the process, to a transmission request destination in accordance with the virtual circuit type communications.

BRIEF DESCRIPTION OF THE DRAWINGS

FIG. 4 is a diagram for explaining a communication process;

FIG. 8 is a flowchart showing an embodiment of a processing flow which is executed by the reception routine 303 in FIG. 3 of the client 30;

FIG. 14 is a flowchart showing an embodiment of a processing flow which is executed by the transmission routine 403 in FIG. 3 of the server 40;

FIG. 19 is a diagram for explaining a resending process;

FIG. 21 is a flowchart showing an embodiment of a processing flow which is executed by the transmission routine 302 in FIG. 15 of the client 30;

FIG. 23 is a flowchart showing an embodiment of a processing flow which is executed by the transmission routine 503 in FIG. 15 of the gateway 50;

FIG. 27 is a flowchart showing an embodiment of a processing flow which is executed by the transmission routine 403 in FIG. 25 of a server 40 in FIG. 25 according to the third embodiment;

FIG. 29 is flowcharts showing embodiments of a processing flow which is executed by a data transfer control program 309 in FIG. 28;

DESCRIPTION OF THE PREFERRED EMBODIMENT

Now, the present invention will be described in detail with reference to the drawings.

Figure 1A:
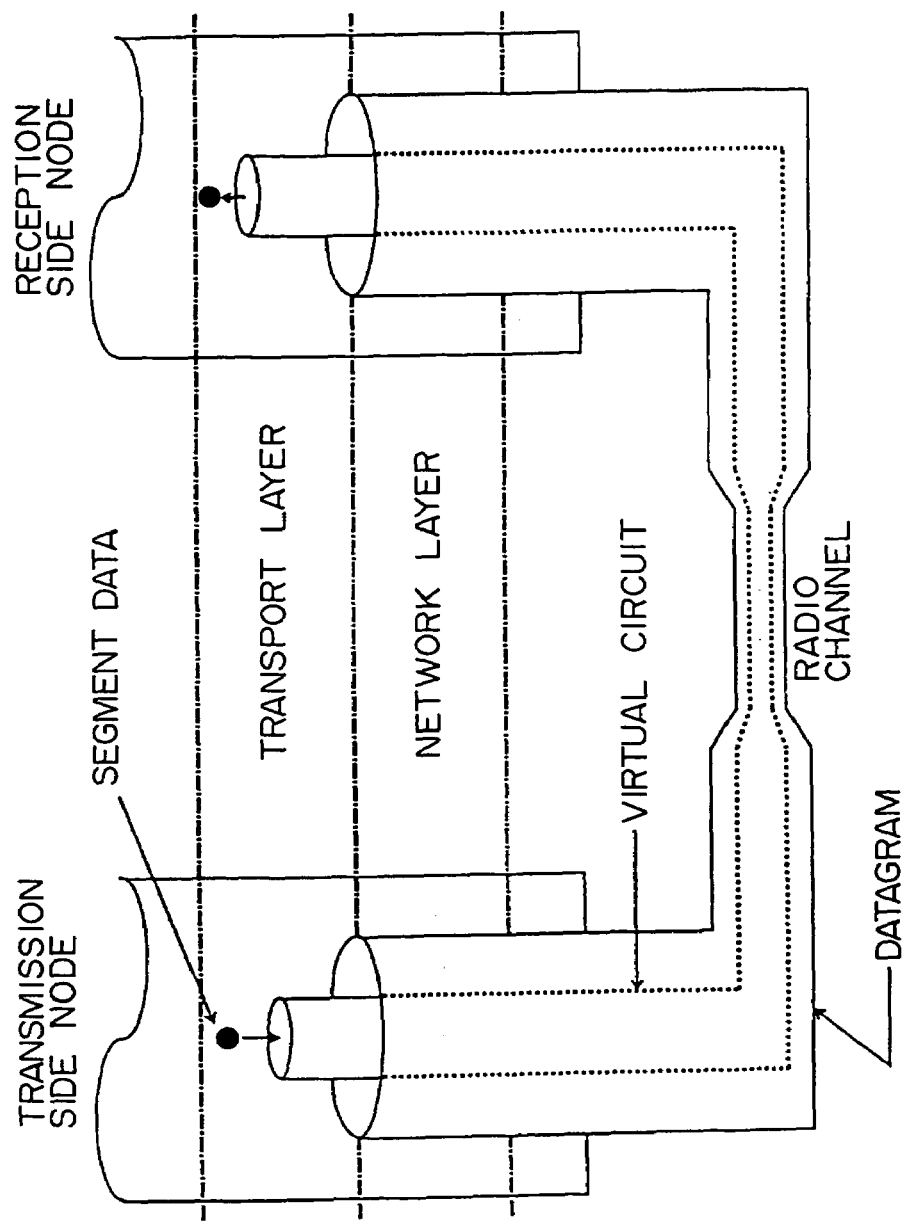
FIG. 1A is a diagram for explaining communications of virtual circuit type.
Figure 1B:
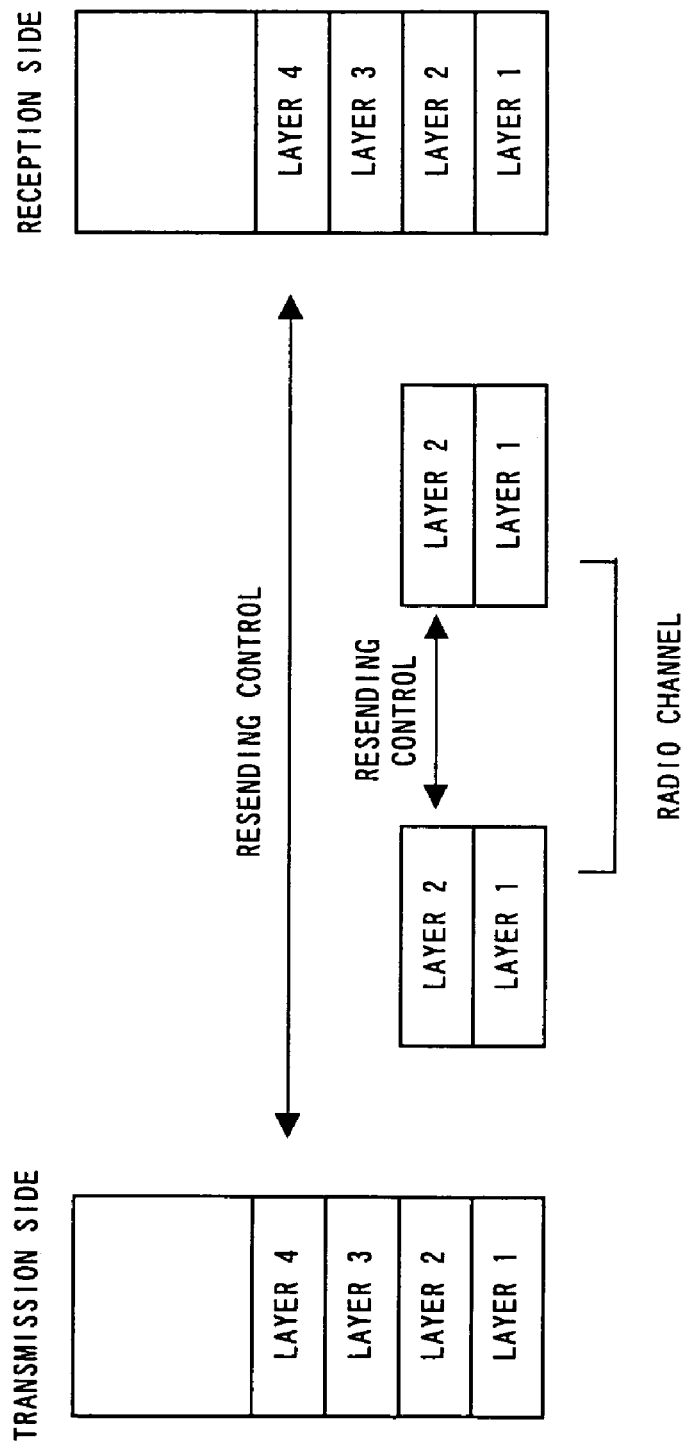
FIG. 1B is a diagram for explaining a prior-art technique.
Figure 2A:
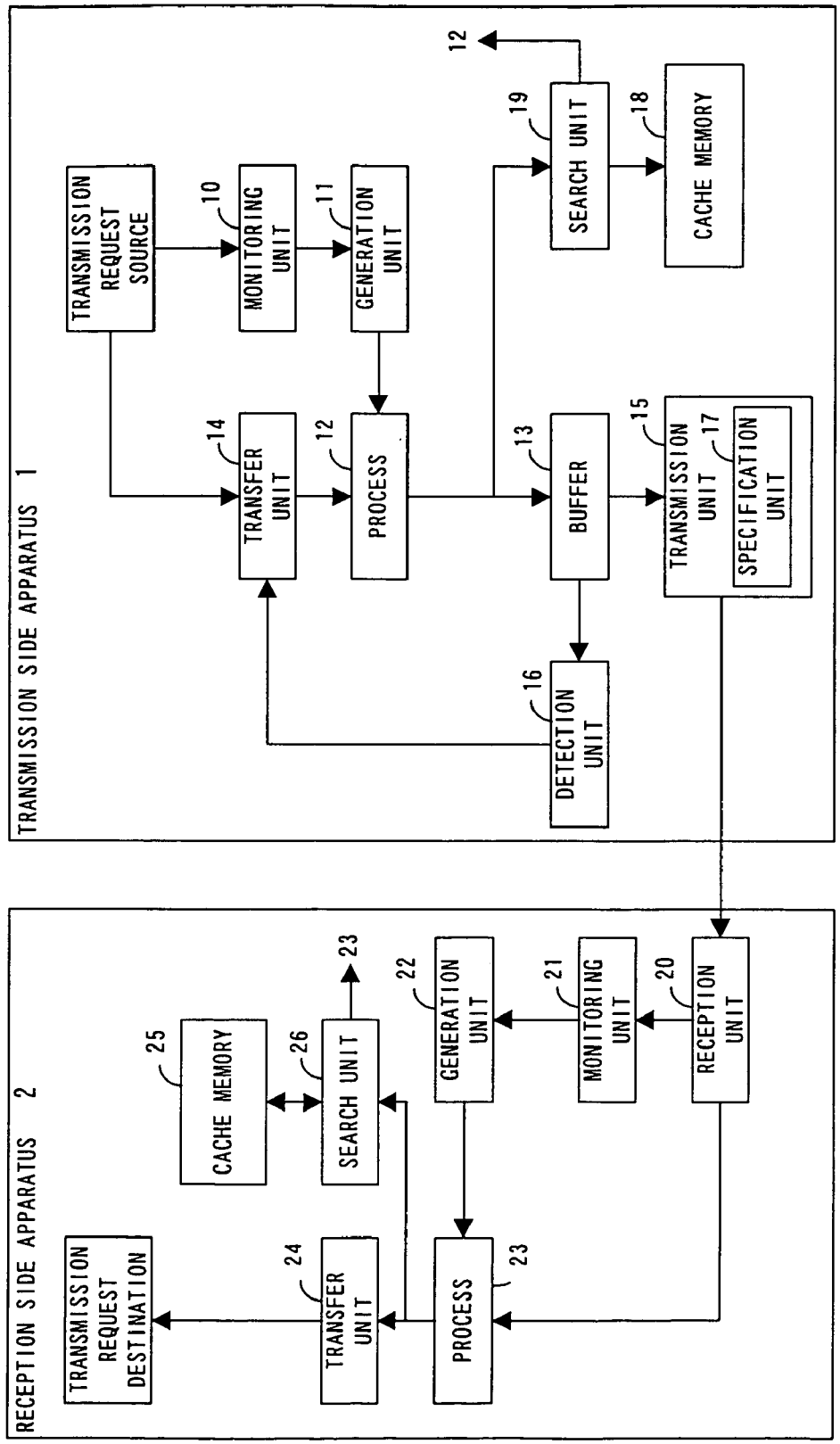
FIG. 2A is a block diagram showing the fundamental construction of the present invention.

Referring to FIG. 2A, a transmission side apparatus 1 is an apparatus to which the present invention is applied, and a reception side apparatus 2 is also an apparatus to which the present invention is applied. The transmission side apparatus 1 of the present invention communicates with the reception side apparatus 2 of the present invention through a radio channel.

The transmission side apparatus 1 of the present invention comprises a monitoring unit 10, a generation unit 11, a process (which has substantially the same significance as that of a "thread" or "routine") 12, a buffer 13, a transfer unit 14, a transmission unit 15, a detection unit 16, a specification unit 17, a cache memory 18 and a search unit 19.

The monitoring unit 10 monitors whether or not a transmission request for data, designating the particular apparatus itself (in which this monitoring unit 10 is included) as a transmission destination, has been issued by the particular apparatus or another apparatus connected thereto through a network. When the monitoring unit 10 has detected the issue of the data transmission request designating the particular apparatus as the transmission destination, the generation unit 11 generates the process 12 which is to serve as a reception destination for the data and also generates the buffer 13 in correspondence with the process 12.

The transfer unit 14 transfers the data requested by a transmission request source, to the process 12 in accordance with communications of virtual circuit type. Then, the process 12 stores the received data in the buffer 13. The transmission unit 15 transmits the data stored in the buffer 13, to the other apparatus through the radio channel. The detection unit 16 detects the data storing state of the buffer 13.

When the radio channel has been disconnected during the data transmission, the specification unit 17 specifies the sequence number of the transmission data at the point of time of the disconnection. The cache memory 18 stores therein data which has been received in response to the data transmission from the transmission unit 15. The search unit 19 makes a search as to whether or not the data requested by the transmission request source is registered in the cache memory 18.

On the other hand, the reception side apparatus 2 of the present invention comprises a reception unit 20, a monitoring unit 21, a generation unit 22, a process 23, a transfer unit 24, a cache memory 25 and a search unit 26.

The reception unit 20 receives data which has been sent in through the radio channel. The monitoring unit 21 monitors whether or not the reception unit 20 has received data which conforms to a protocol suspended or interrupted in the layers of the radio channel.

When the monitoring unit 21 has detected the reception of the pertinent data, the generation unit 22 generates the process 23 which is to serve as a reception destination for the data. The transfer unit 24 transfers the data received by the process 23, to a transmission request destination in accordance with the virtual circuit type communications.

The cache memory 25 stores therein the data which has been received in response to the data transfer from the transfer unit 24. The search unit 26 makes a search as to whether or not the data requested by the data sent in through the radio channel is registered in the cache memory 25.

Here, the functions bestowed on the transmission side apparatus 1 of the present invention and the functions bestowed on the reception side apparatus 2 of the present invention are concretely incarnated by programs. The programs are stored in a portable recording medium such as a floppy disk, the hard disk of a server, and so forth. Such programs are installed from the storage media into the transmission side apparatus 1 and reception side apparatus 2, and they are loaded into memories and are run by CPUs (central processing units). Thus, the present invention is realized.

The transmission side apparatus 1 of the present invention thus constructed operates as explained below. When the monitoring unit 10 has detected that a transmission request for data, designating the particular apparatus 1 itself as a transmission destination, has been issued by the particular apparatus 1 or another apparatus connected thereto through a network, the generation unit 11 generates the process 12 to serve as a reception destination for the data and also generates the buffer 13 in correspondence with the process 12.

Upon the generation processing of the generation unit 11, the transfer unit 14 transfers the data requested by the transmission request source, to the process 12 in accordance with communications of virtual circuit type. The process 12 stores the received data in the buffer 13. Then, the transmission unit 15 transmits the data stored in the buffer 13, to the other apparatus through the radio channel.

On this occasion, in issuing the request for the data transmission, the particular apparatus 1 is designated as the transmission destination, and any other apparatus is not designated as such. Therefore, the transmission unit 15 sometimes transmits transmission destination information which is to be designated in an upper layer with respect to the layers of the radio channel, in the way, for example, that the address of the other apparatus as the transmission destination is acquired by referring to a file which manages the mapping relations between the destinations of transmission requests and the addresses of apparatuses expanding the requests, whereupon the data is transmitted to the other apparatus of the acquired address. Due to this contrivance, the transmission side apparatus 1 operates as a proxy which makes it seem as if the transmission destination existed therein, to the transmission request source for the data.

Figure 2B:
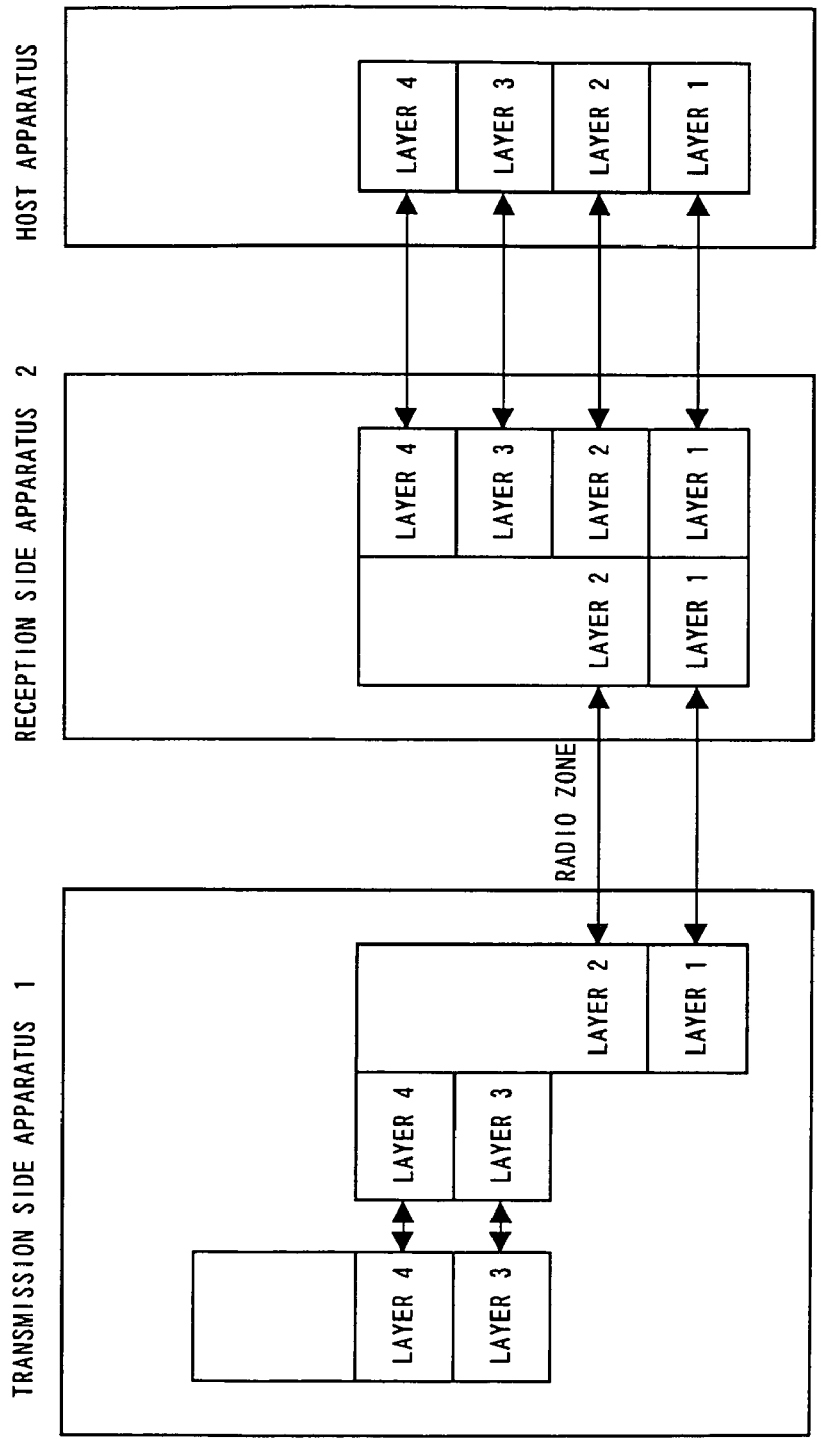
FIG. 2B is a diagram for explaining the present invention.

Thus, according to the transmission side apparatus 1 of the present invention, enhancement in the throughput of end-to-end data communications is realized in such a way that, as illustrated in FIG. 2B, a resending control for guaranteeing data, which conforms to the protocol of a transport layer (layer #4), is terminated on this side of the radio channel, while the data transmission over the unstable radio channel is performed by utilizing the protocol of the data link layer (layer #2) of the radio channel.

In the case of adopting the contrivance, when the detection unit 16 has detected that the buffer 13 is about to overflow, the transfer unit 14 controls the communication speed of the virtual circuit type communications so as to lower, thereby to prevent the buffer 13 from overflowing.

In addition, when the specification unit 17 has specified the sequence number of the transmission data at the point of time of the disconnection of the radio channel, the transmission unit 15 restarts the data transmission from the specified sequence number upon the re-connection of the radio channel, thereby performing a control for the avoidance of transmitting data already received by the opposite apparatus, again over the radio channel.

In addition, in some cases, a plurality of buffers 13 are concurrently generated, and the transmission unit 15 transmits data successively in the order of the preset priority levels of the buffers 13 or transmits data while setting the transmission cycles of the buffers 13 of the higher priority levels to be shorter.

Further, when the search unit 19 searching the cache memory 18 has detected that the data requested by the transmission request source is registered in the cache memory 18, the detected data in the cache memory 18 is immediately notified to the transmission request source without executing the transmission processing by the transmission unit 15.

On the other hand, the reception side apparatus 2 of the present invention constructed as stated before operates as explained below. When the reception unit 20 has received data conforming to a protocol suspended in the layers of the radio channel, the generation unit 22 generates the process 23 to serve as a reception destination for the data.

Upon the generation processing of the generation unit 22, the transfer unit 24 transfers the data received by the generated process 23, to the transmission request destination in accordance with the virtual circuit type communications.

Thus, according to the reception side apparatus 2 of the present invention, enhancement in the throughput of end-to-end data communications is realized in such a way that a resending control for guaranteeing data, which is performed in a transport layer, is terminated on this side of the radio channel, while regarding the data transmission over the unstable radio channel, the data transmitted from the transmission side apparatus 1 of the present invention is received by utilizing the protocol of the data link layer of the radio channel.

In the case of adopting the contrivance, when the search unit 26 searching the cache memory 25 has detected that the data requested by the transmission request source is registered in the cache memory 25, the detected data in the cache memory 25 is immediately notified to the transmission request source without the operation of the transfer unit 24 that the data from the transmission request source is transferred to the transmission request destination.

As thus far explained, according to the present invention, the resending control for guaranteeing data as it proceeds with the protocol of the transport layer is terminated on this side of the radio channel, while the data transmission over the unstable radio channel is carried out by utilizing the protocol of the data link layer of the radio channel. It is accordingly possible to realize enhancement in the throughput of end-to-end data communications.

Moreover, according to the present invention, the apparatus is permitted to operate as the proxy which makes it seem as if the transmission request destination existed therein (for example, in the particular apparatus itself), to the transmission request source for the data.

In the embodiments to be described below, it is assumed that the TCP (Transmission Control Protocol) and the IP (Internet Protocol) which are generally used in the Internet are respectively employed as the protocols of a transport layer and a network layer.

Figure 3:
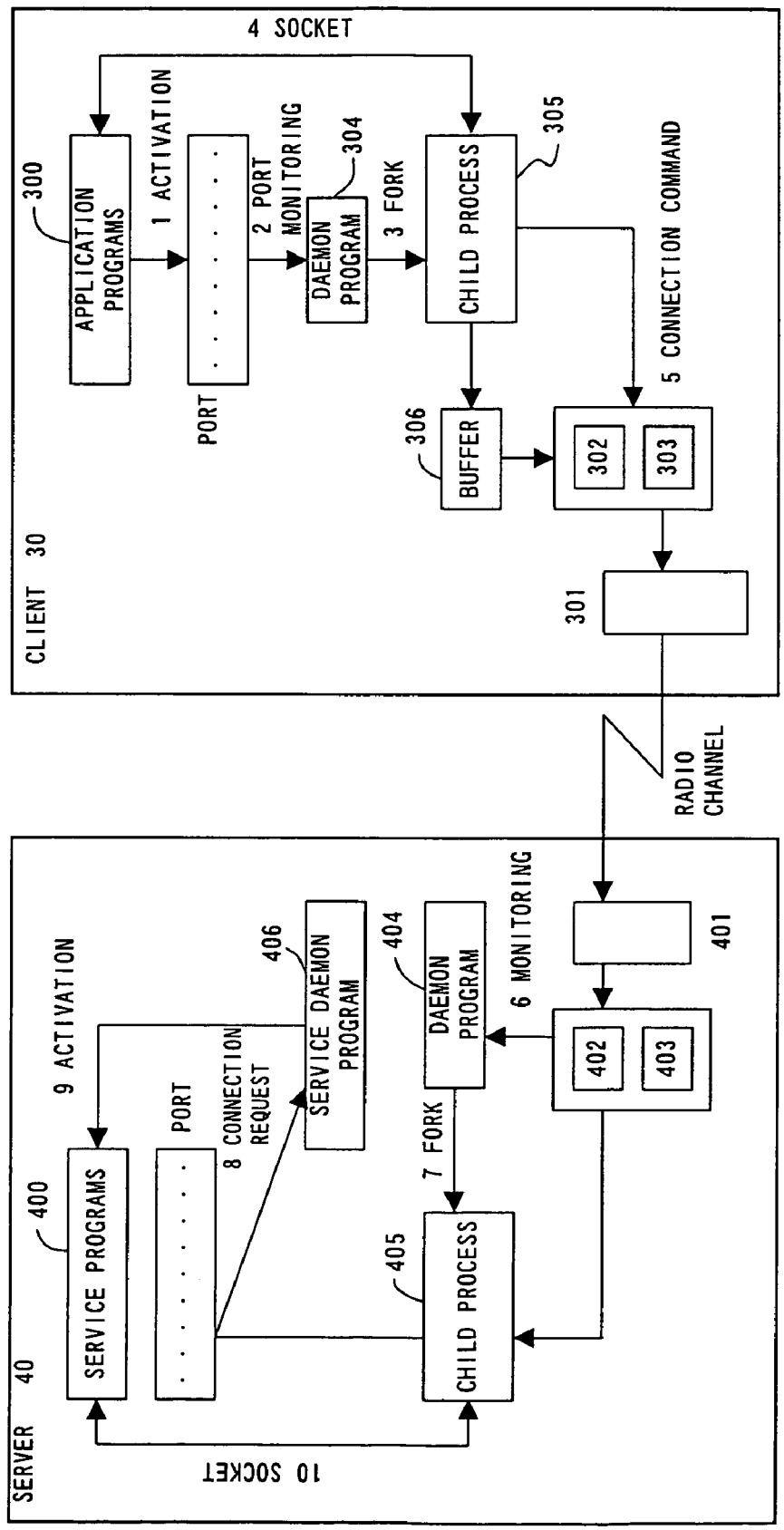
FIG. 3 is a block diagram showing an embodiment of the present invention.

FIG. 3 is a block diagram showing the architecture of an information system in an embodiment of the present invention.

Referring to the figure, a client 30 is an apparatus which expands and runs any of application programs 300 on a memory so as to issue a service request. On the other hand, a server 40 is an apparatus which expands and runs any of several service programs 400 such as SMTP, FTP, TELNET, rcp, rlogin and HTTP, on a memory, which is communicatively connected with the client 30 through a radio channel and which offers a service to the client 30. Incidentally, it is assumed in this embodiment that the client 30 and the server 40 communicate in one-to-one correspondence.

The client 30 includes a radio equipment 301 which is configured of a portable telephone and a data communication adaptor, a transmission routine 302 which is generated and activated as a thread or process and which transmits data through an interface for connecting the radio equipment 301, a reception routine 303 which receives data through the interface for connecting the radio equipment 301, a daemon program 304 which monitors a port number designated by the TCP (for designating the service program 400), a child process 305 which is generated when the application program 300 has issued a service request by designating a "service program name (or port number), localhost" as a destination and which accepts data issued by the application program 300, in accordance with communications of the virtual circuit type (connection type) by the use of a socket extended between this child process 305 and the application program 300, and a buffer 306 which is generated in correspondence with the child process 305 and in which the data accepted by the child process 305 is stored.

Here, "localhost" indicates the IP address (the address of a node designated by the IP) of the particular apparatus itself. The above "service program name (or port number), localhost" signifies that the service program 400 which is expanded in the memory of the particular apparatus (the program 400 need not always be already expanded) is designated as the destination.

On the other hand, the server 40 includes a radio equipment 401 which is configured of a portable telephone and a data communication adaptor, a reception routine 402 which receives data through an interface for connecting the radio equipment 401, a transmission routine 403 which transmits data through the interface for connecting the radio equipment 401, a daemon program 404 which monitors whether or not the reception routine 402 has received data destined for the particular apparatus itself and conforming to the protocol suspended in the layer of the radio channel, a child process 405 which is generated when the daemon program 404 has detected the reception of the pertinent data and which transfers the data sent in from the client 30, to the service program 400 in accordance with the virtual circuit type (connection type) communications by the use of a socket extended between this child process 405 and the service program 400, and a service daemon program 406 which monitors a destination port number accepted by the child process 405 and which activates the service program 400 pointed to by the destination port number.

Incidentally, although no illustration is made in FIG. 3, the server 40 acting as the reception side is also furnished with a buffer in correspondence with the reception routine 402. As will be explained later, however, the buffer is not disposed for absorbing the difference between the speeds of data transfer, but it is disposed for merely delivering data to the memory (the exchange of data through the memory).

Here, the programs which are expanded on the memories of the client 30 and the server 40 are stored in a portable recording medium such as a floppy disk, the hard disk of a server, and so forth, and they are installed from them.

In the case of employing the TCP, the information system is so constructed that the program on the transmission side and the program on the reception side are communicatively connected by designating the transmission-source port number and the destination port number.

In the embodiment of FIG. 3 thus constructed, therefore, the client 30 monitors the ports by running the daemon program 304 and waits for a connection request from the application program 300.

Under this state, the application program 300 is activated as indicated by "1 activation" in the figure. Then, when a service which is offered by the server 40 is required, the application program 300 issues a service request by designating the address "localhost" for commanding the radio equipment 301 to establish a connection to the particular apparatus itself, together with the port number which specifies the service program 400 offering the service. Therefore, the daemon program 304 monitors the ports as indicated by "2 port monitoring" in the figure, thereby monitoring whether or not the service request designating the address "localhost" has been issued by the application program 300.

Upon detecting that the application program 300 has issued the service request by designating the address "localhost", the daemon program 304 generates the child process 305 for the intermediation processing of data transfer as indicated by "3 fork" in the figure, by issuing a system call "fork" by way of example, and also generates the buffer 306 in correspondence with the child process 305, in order to transmit data to the server 40. The child process 305 and the buffer 306 are generated in correspondence with a session number which functions as the identification number of the application program 300.

When the child process 305 has been generated, the application program 300 establishes a socket connection between it and the child process 305 as indicated by "4 socket" in the figure, and it transfers the data to be transmitted to the server 40, to the child process 305 by the use of the virtual circuit type communications. Upon accepting the data, the child process 305 commands the radio equipment 301 to establish the connection to the radio channel, as indicated by "5 connection command" in the figure, thereby connecting the radio channel, and stores the data transferred from the application program 300, in the buffer 306. Then, the transmission routine 302 sends out the data stored in the buffer 306, to the radio equipment 301.

Heretofore, the application program 300 of the client 30 has issued a service request by designating the service program 400 to become a service request destination, for the service daemon program 406 of the server 40. In contrast, according to this embodiment, the application program 300 issues the service request by designating the address "localhost" to function as the IP address of the particular apparatus itself. Owing to this processing, the child process 305 stores the data to be transmitted to the server 40, in the buffer 306 within the client 30 in accordance with the virtual circuit type communications having no unstable factor.

In this manner, the client 30 of this embodiment is so contrived that a resending control for guaranteeing data, which is performed in conformity with the transport layer protocol, is once terminated on this side of the radio channel.

Upon accepting a transmission command from the child process 305, the radio equipment 301 transmits the data of the buffer 306 sent in by the sending-out processing of the transmission routine 302, to the server 40 through the radio channel while performing a resending control in the data link layer of the radio channel, and so forth.

In the transmission processing over the radio channel, a transmission speed is low because the radio channel is unstable. Therefore, the buffer 306 is disposed in order to absorb the speed difference between the transmission speed and the high speed of the data transfer from the application program 300 to the child process 305.

As stated above, the application program 300 of the client 30 has heretofore issued the service request by designating the service program 400 to become the service request destination, for the service daemon program 406 of the server 40, whereas in this embodiment, the application program 300 issues the service request by designating the address "localhost" to function as the IP address of the particular apparatus itself, thereby terminating the protocols TCP/IP on this side of the radio channel. Accordingly, the server 40 cannot activate the service program 400 when left intact.

More specifically, if the protocols TCP/IP are not terminated, the port number and IP address which are designated by the protocols TCP/IP are notified to the server 40 in the state in which they are wrapped in the header of the frame of the layers of the radio channel. In contrast, when the protocols TCP/IP are terminated on this side of the radio channel, the port number and IP address designated by the protocols TCP/IP are not notified to the server 40. In consequence, the server 40 cannot activate the service program 400.

Therefore, processing as illustrated in FIG. 4 is executed. In issuing a service request to the server 40, the client 30 sends the server 40, for example, the port number designated by the application program 300 and the session number (Sn) of the application program 300 before the transmission of data. Subsequently, the client 30 transmits the data.

Here, the session numbers are numbers which are assigned to the respective application programs 300. When the different application programs 300 have issued service requests for the service program 400 specified by the same port number, the service requests of the individual application programs 300 are identified by the session numbers. Incidentally, the session numbers are assigned by the daemon program 304, while the port numbers are assigned by an OS (operating system).

Herein, on the side of the server 40, the daemon program 404 monitors whether or not the reception routine 402 has received data (transmitted by the client 30) destined for the particular apparatus itself and conforming to the protocol suspended in the layer of the radio channel, as indicated by "6 monitoring" in FIG. 3. Upon detecting that the reception routine 402 has received the pertinent data, the daemon program 404 generates the child process 405 for accepting the data received by the reception routine 402, as indicated by "7 fork" in FIG. 3 and by issuing a system call "fork" by way of example, in order to transfer data to the service program 400.

Here, the child process 405 is generated in correspondence with the session number functioning as the identification number of the application program 300, likewise to that 305 of the client 30.

When thus generated, the child process 405 issues a connection request as indicated by "8 connection request" in FIG. 3, for the service daemon program 406 specified by the port number sent in from the client 30 (the program 406 operates to activate the service program 400 specified by the port number). As indicated by "9 activation" in FIG. 3, the service daemon program 406 responds to the connection request to activate the service program 400 which offers the service requested by the application program 300.

Upon activation, the child process 405 establishes a socket connection between it and the activated service program 400, as indicated by "10 socket" in FIG. 3, and it transfers the data sent in from the client 30, to the service program 400 by the use of virtual circuit type communications.

In this way, the server 40 of the embodiment receives the data sent in from the client 30 of the embodiment.

This embodiment shown in FIG. 3 has been described on the processing in the case where the client 30 issues the service request and notifies the issue to the server 40. In a case where, in response to the service request, the service program 400 executes the service and returns the result of the service to the application program 300, the transmission processing of the client 30 explained in conjunction with FIG. 3 is executed by the server 40, and the reception processing of the server 40 explained in conjunction with FIG. 3 is executed by the client 30.

Next, there will be explained those processing flows of FIGS. 5 through 14 which are executed in the embodiment constructed as described above in conjunction with FIG. 3.

Figure 5:
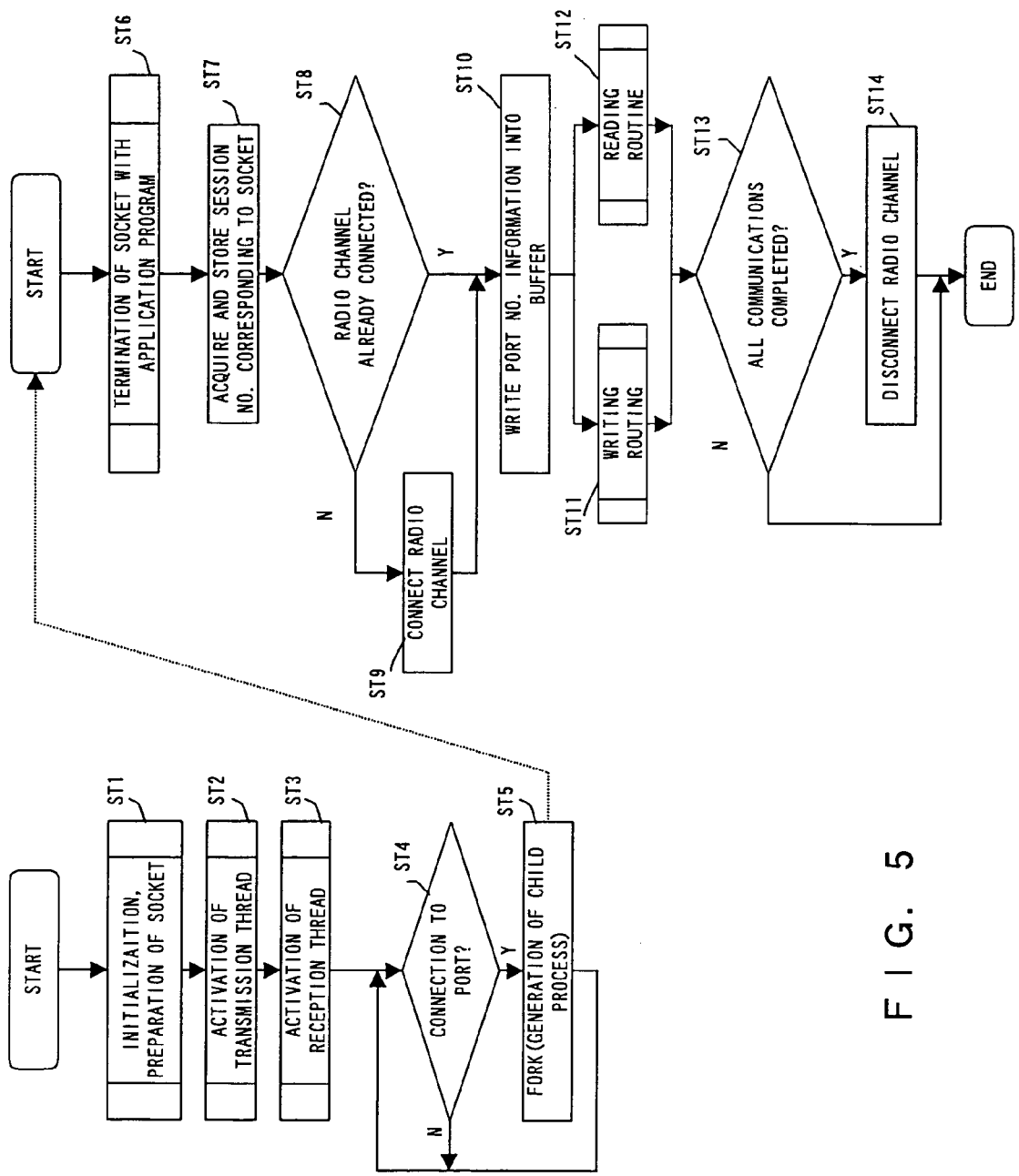
FIG. 5 is a flowchart showing an embodiment of the overall processing flow which is executed by a client 30 in FIG. 3.
Figure 6:
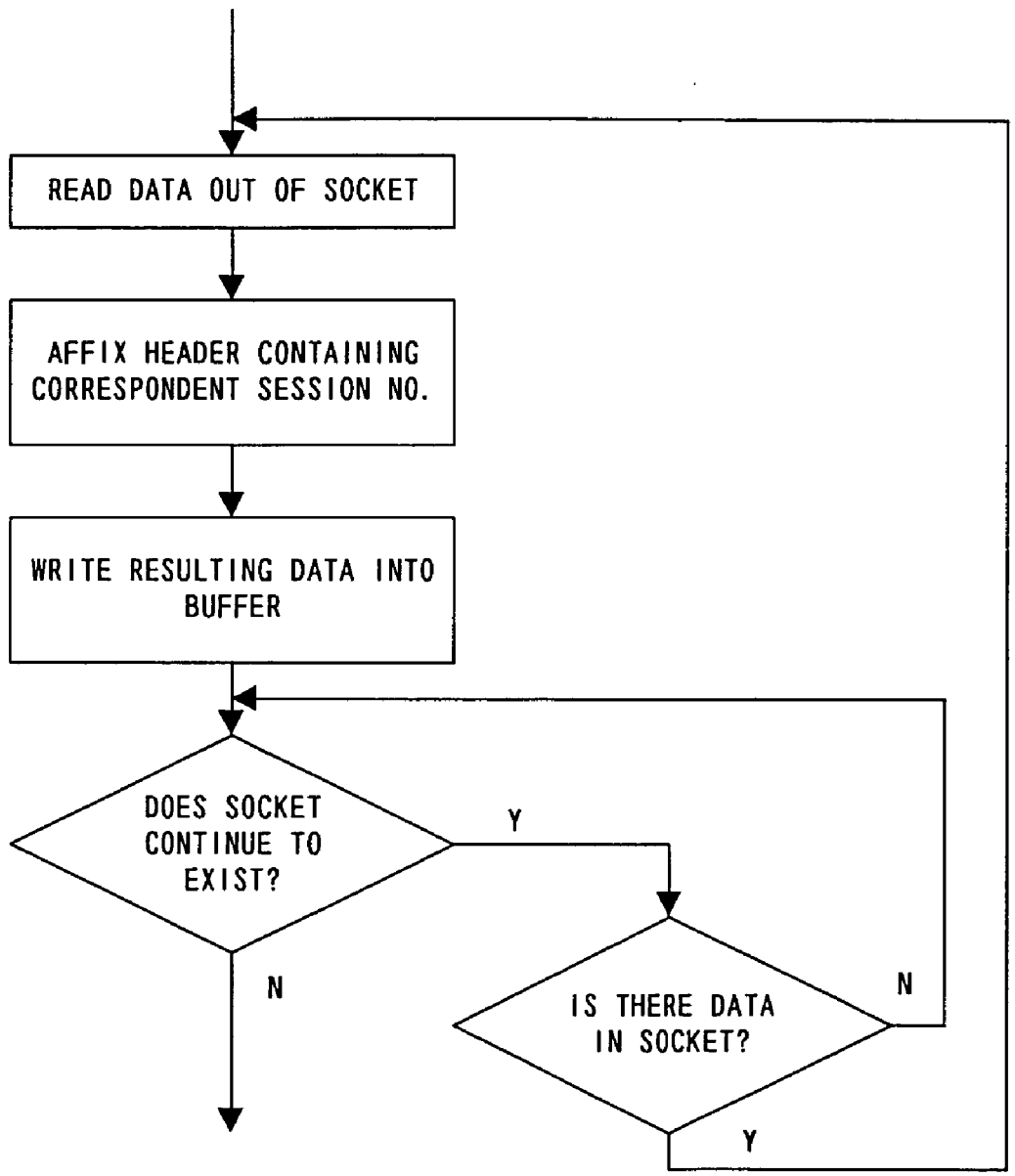
FIG. 6 is a flowchart showing an embodiment of a processing flow which is executed by the writing routine of the client 30.
Figure 7:
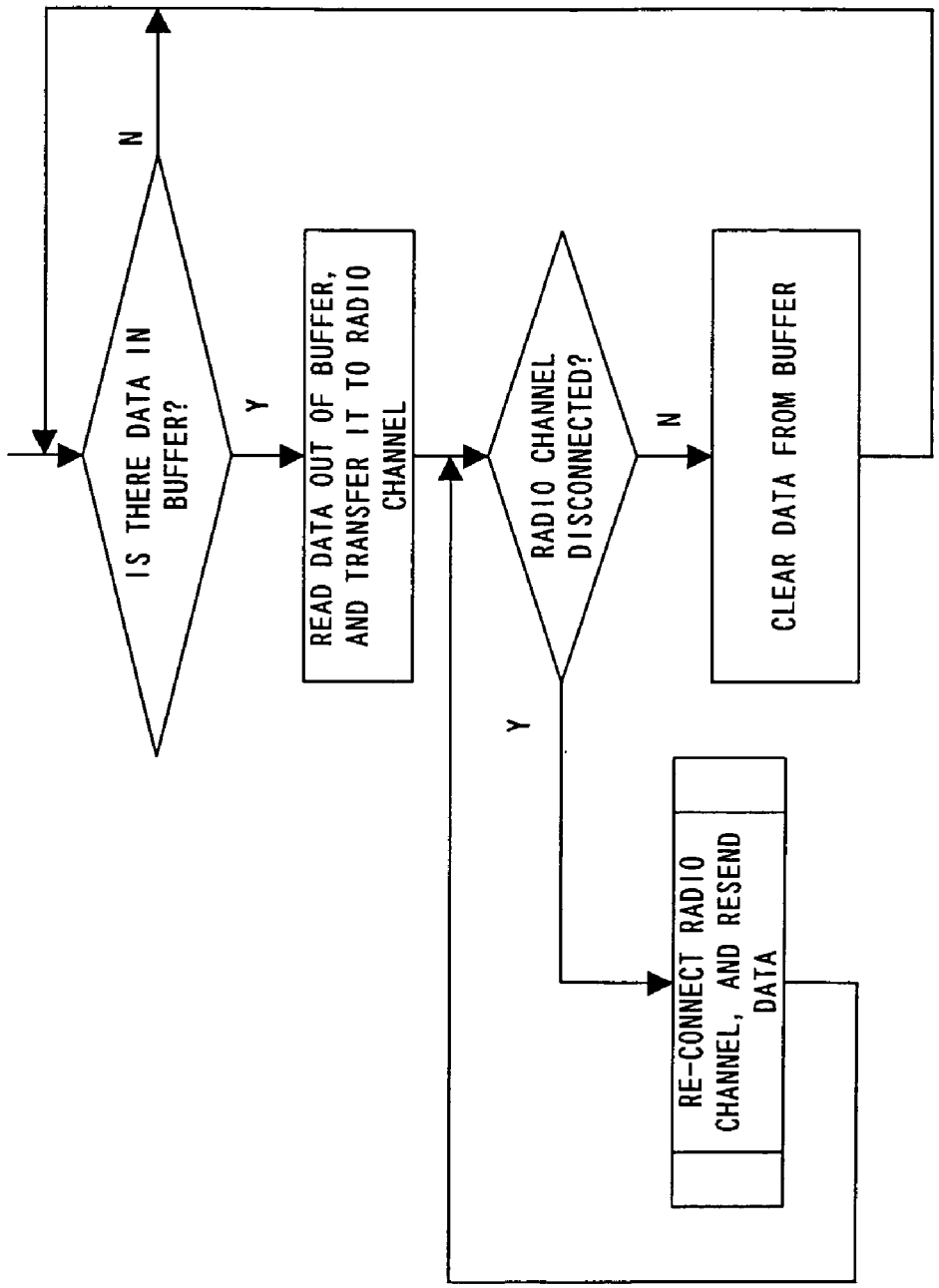
FIG. 7 is a flowchart showing an embodiment of a processing flow which is executed by the transmission routine 302 in FIG. 3 of the client 30.
Figure 9:
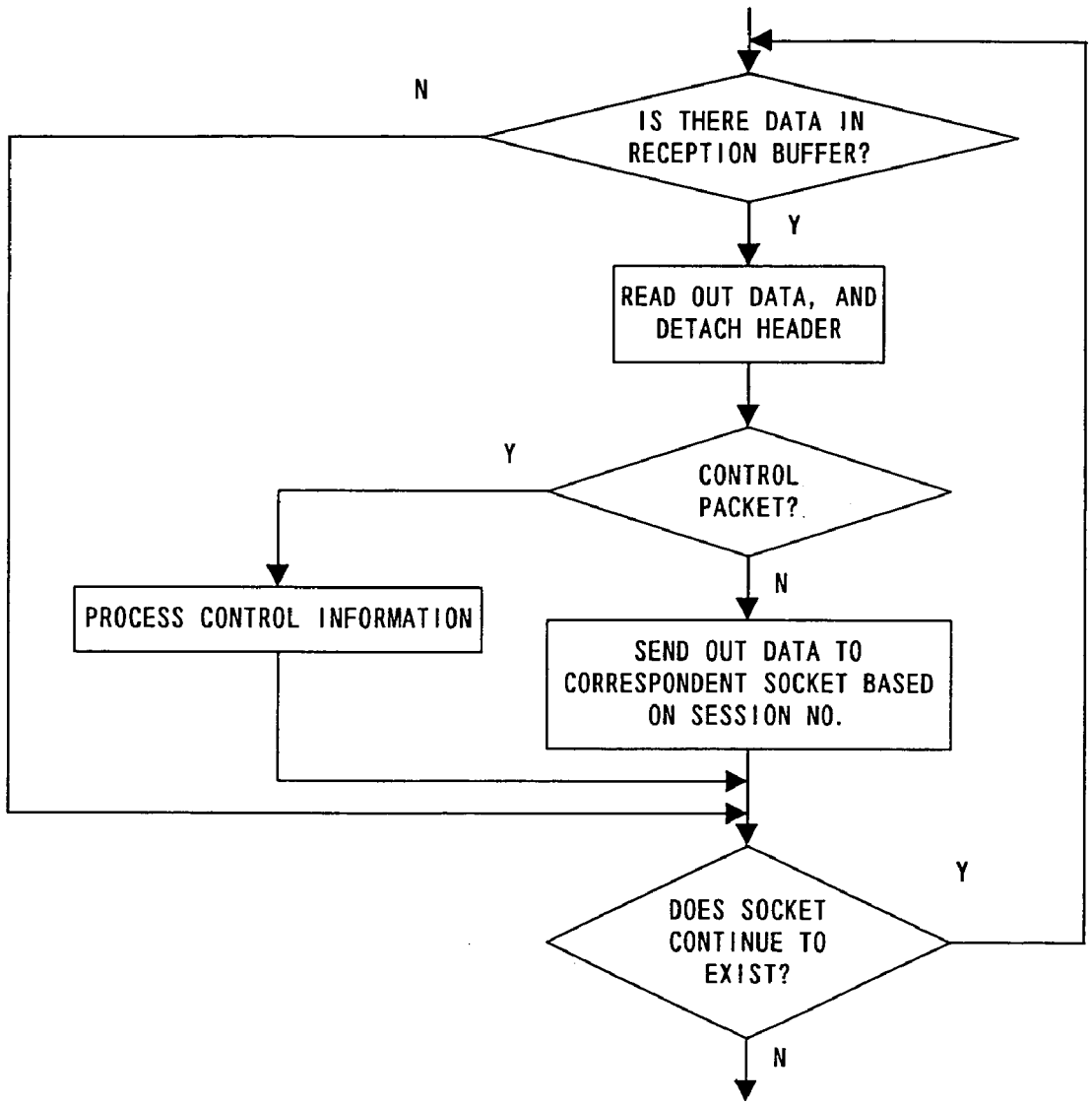
FIG. 9 is a flowchart showing an embodiment of a processing flow which is executed by the reading routine of the client 30.
Figure 10:
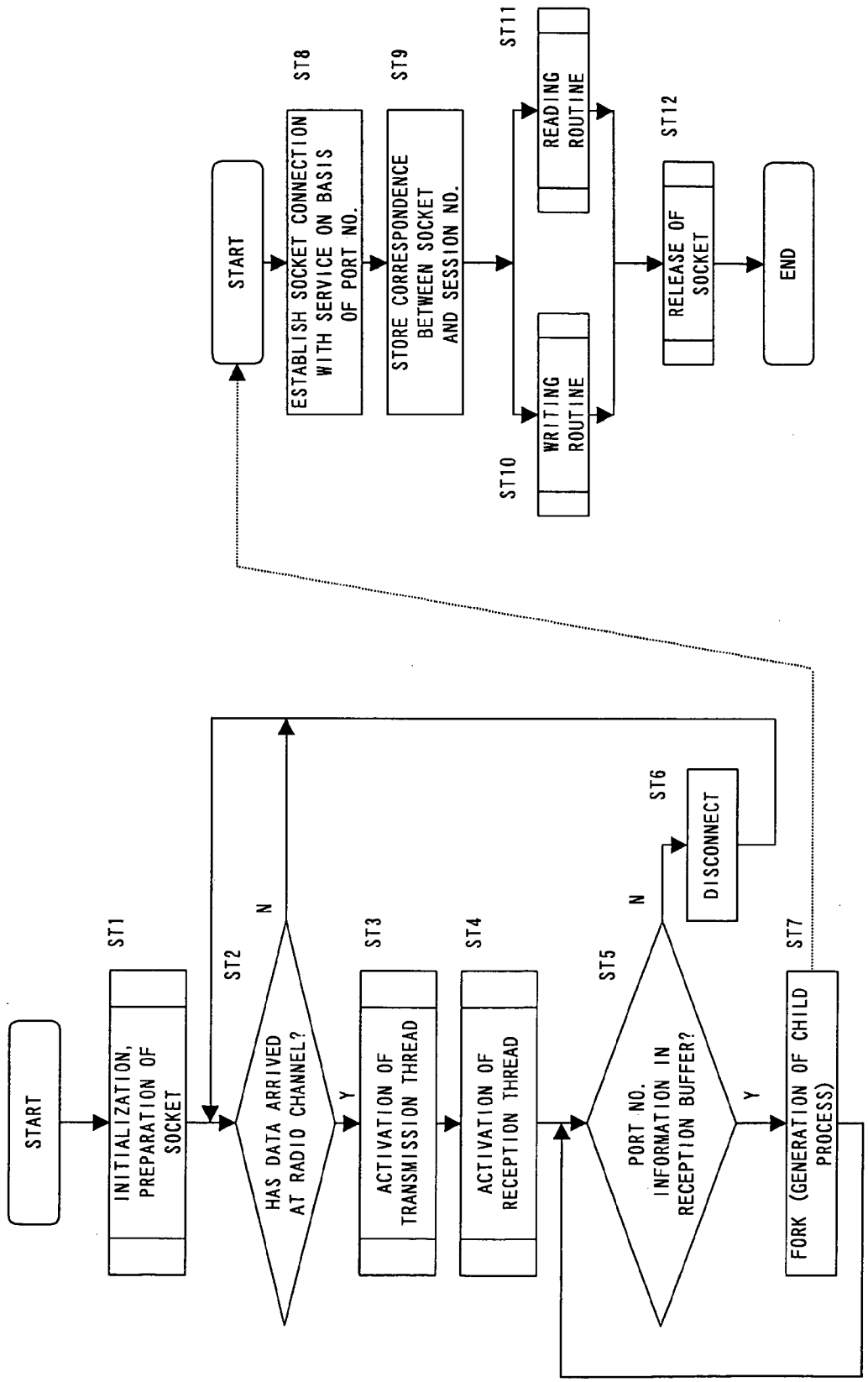
FIG. 10 is a flowchart showing an embodiment of the overall processing flow which is executed by a server 40 in FIG. 3.
Figure 11:
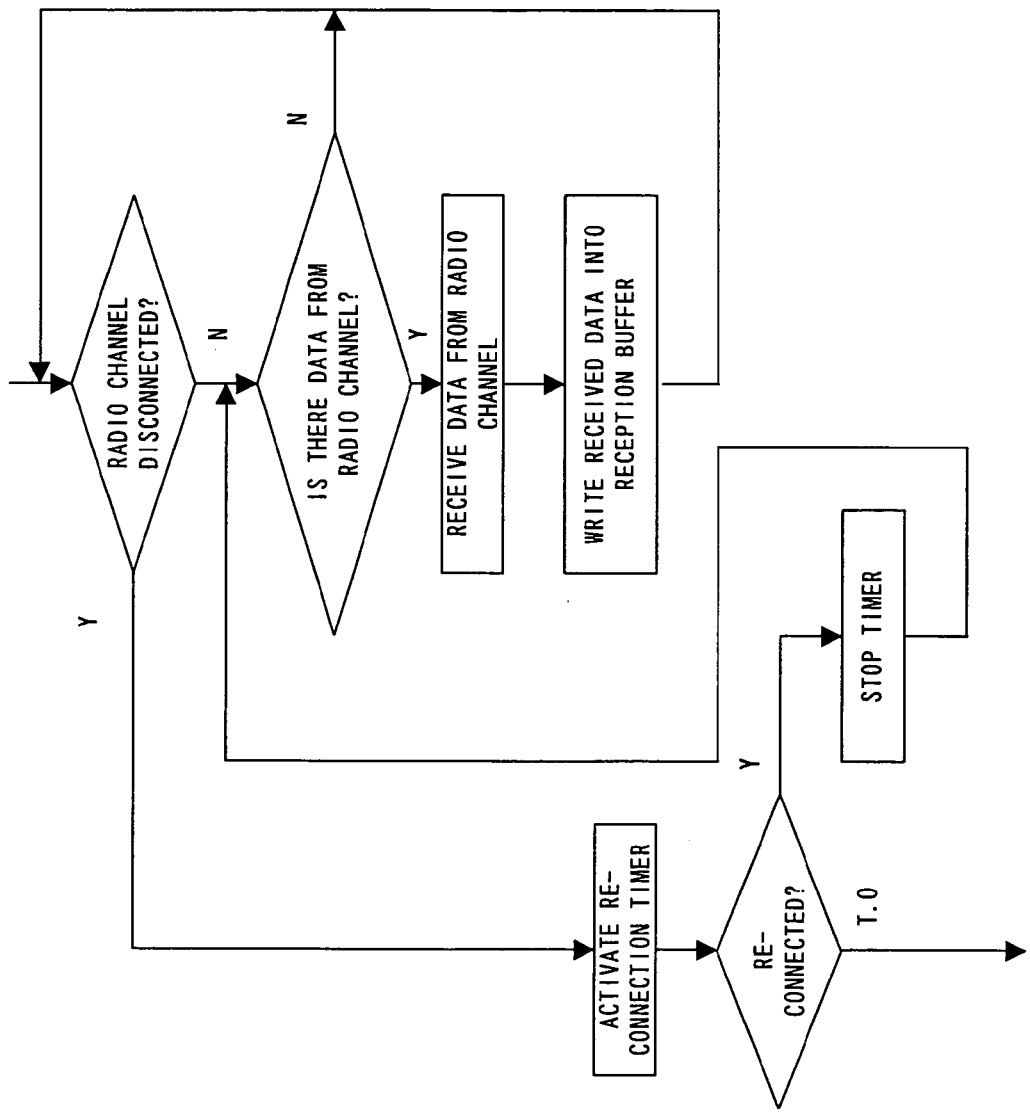
FIG. 11 is a flowchart showing an embodiment of a processing flow which is executed by the reception routine 402 in FIG. 3 of the server 40.
Figure 12:
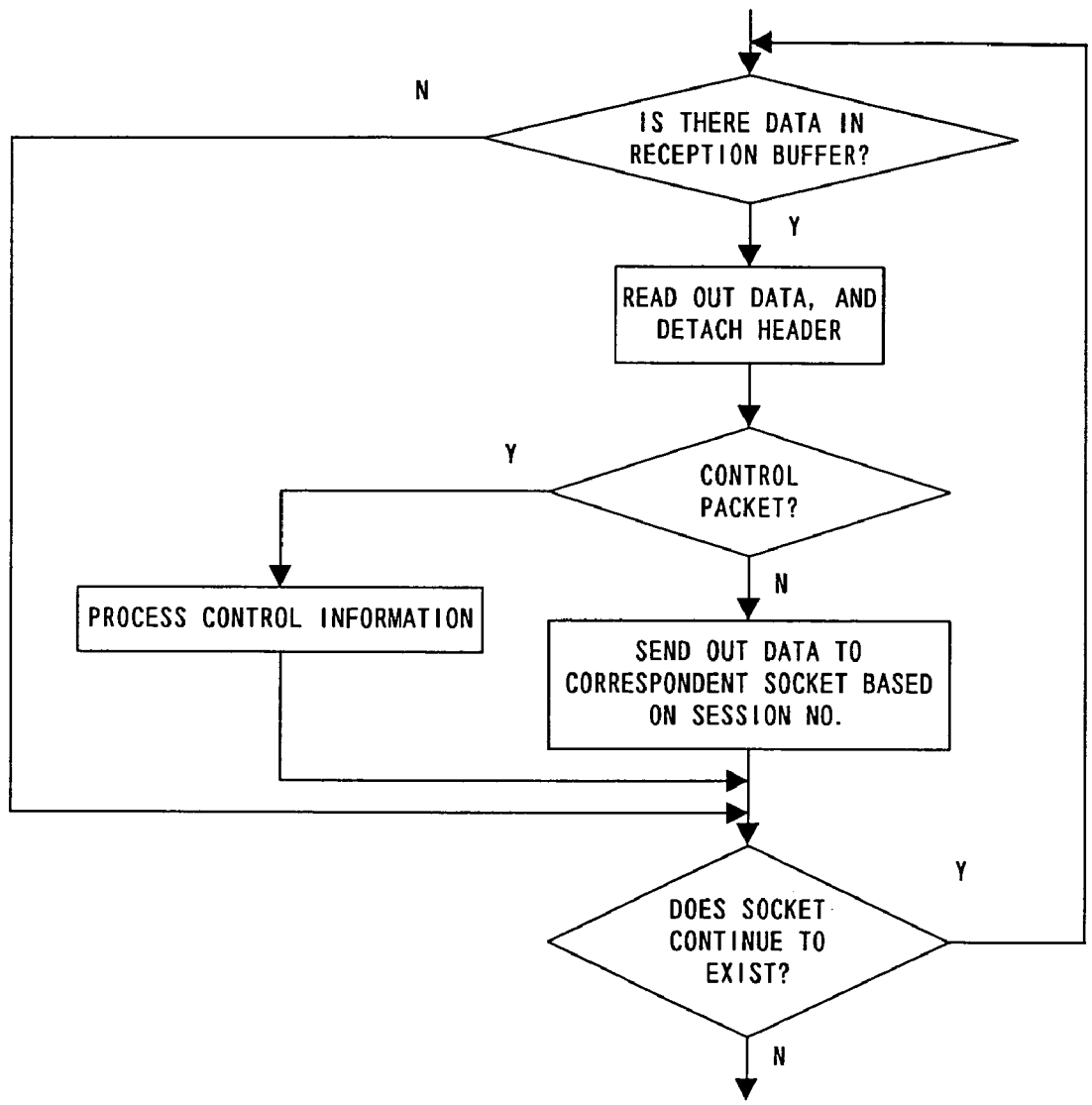
FIG. 12 is a flowchart showing an embodiment of a processing flow which is executed by the reading routine of the server 40.
Figure 13:
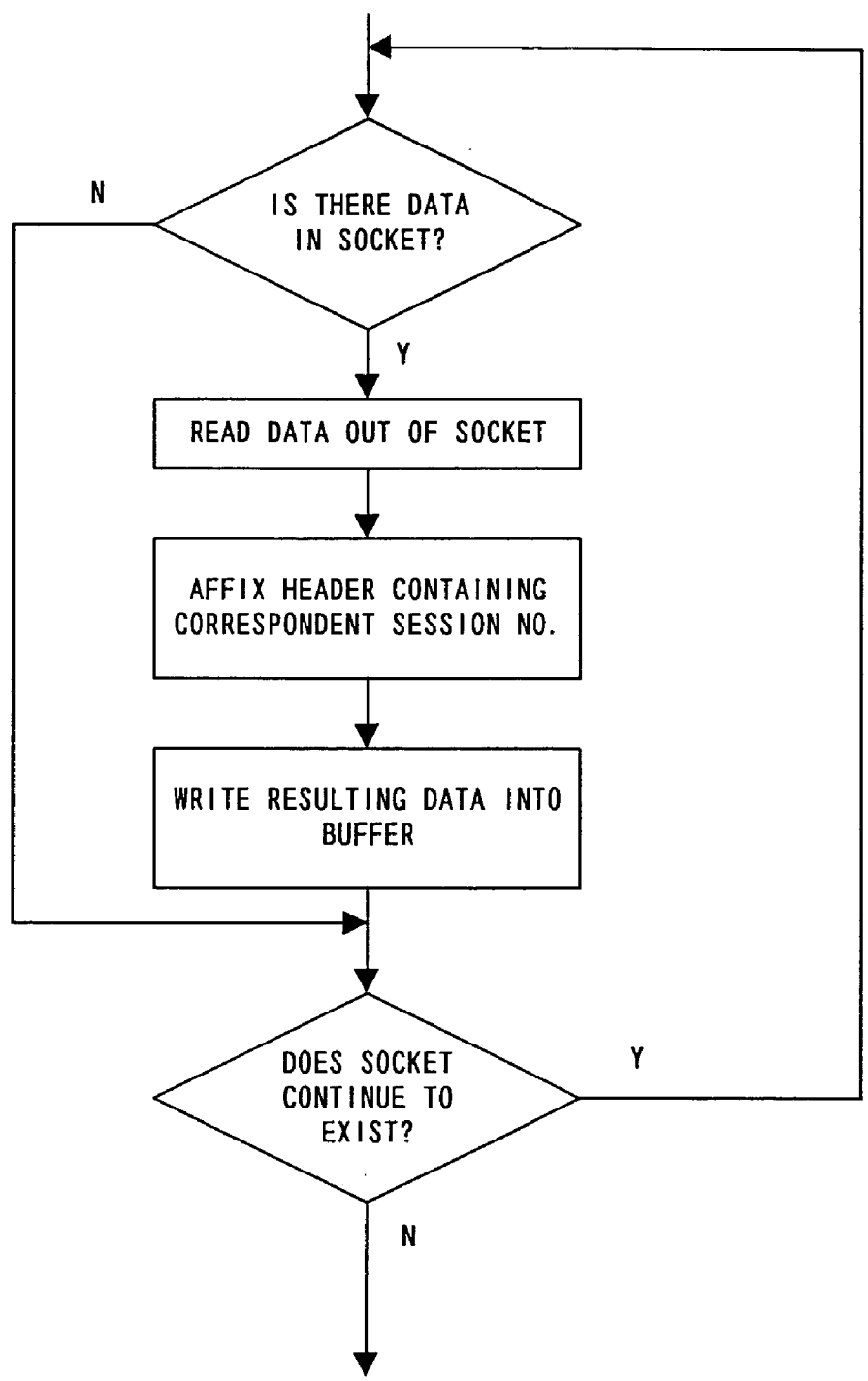
FIG. 13 is a flowchart showing an embodiment of a processing flow which is executed by the writing routine of the server 40.

Here, FIG. 5 illustrates an embodiment of the overall processing flow which is executed by the client 30, FIG. 6 illustrates an embodiment of the processing flow which is executed by the writing routine of the client 30, FIG. 7 illustrates an embodiment of the processing flow which is executed by the transmission routine 302 of the client 30, FIG. 8 illustrates an embodiment of the processing flow which is executed by the reception routine 303 of the client 30, FIG. 9 illustrates an embodiment of the processing flow which is executed by the reading routine of the client 30, FIG. 10 illustrates an embodiment of the overall processing flow, which is executed by the server 40, FIG. 11 illustrates an embodiment of the processing flow which is executed by the reception routine 402 of the server 40, FIG. 12 illustrates an embodiment of the processing flow which is executed by the reading routine of the server 40, FIG. 13 illustrates an embodiment of the processing flow which is executed by the writing routine of the server 40, and FIG. 14 illustrates an embodiment of the processing flow which is executed by the transmission routine 403 of the server 40.

As shown in the processing flow of FIG. 5, first of all, the client 30 executes initialization processing and prepares a socket in step ST1. Subsequently, the transmission routine 302 functioning as a transmission thread (the word "thread" has substantially the same significance as that of a "process" or "routine") is activated in step ST2, and the reception routine 303 functioning as a reception thread is activated in step ST3.

Further, in step ST4, the client 30 waits until a connection request for a port designating an address "localhost" is issued by the application program 300. When the connection request has been issued, the processing flow proceeds to step ST5, in which the daemon program 304 generates the child process 305 and the buffer 306.

When the child process 305 has been generated, the socket is extended between the application program 300 and the child process 305 in step ST6. Subsequently, a session number corresponding to the socket is acquired from the daemon program 304 and is stored in step ST7. Further, whether or not the radio channel has been connected is determined in step T8. Subject to the determination that the radio channel is not connected yet, the processing flow proceeds to step ST9, at which the radio channel is connected, and which is followed by step ST10. On the other hand, subject to the determination of step ST8 that the radio channel has already been connected, step ST8 is immediately followed by step ST10.

In step ST10, a control packet with the session number affixed to port number information is generated and is written into the buffer 306. Next, in step ST11, data sent in from the socket (data transferred by the application program 300) is written into the buffer 306 in accordance with a writing routine (which executes the processing of writing into the buffer 306, and which is prepared in correspondence with the buffer 306 by way of example). Simultaneously, the data stored in the buffer 306 is transmitted to the server 40 through the radio channel in accordance with the transmission routine 302.

Here, in a case where the client 30 acts as a reception side, processing as indicated by step ST12 is executed. Concretely, data transmitted from the server 40 is received into a reception buffer for merely delivering the data to a memory (the buffer being a storage area for the received data, which is used for exchanging the received data between the reception routine 303 and a reading routine) in accordance with the reception routine 303, while at the same time, the data is read out of the reception buffer and is thrown into the socket in accordance with the reading routine (which executes the processing of reading from the reception buffer, and which is prepared in correspondence with the reception buffer by way of example).

Subsequently, whether or not all the communications have been completed is determined in step ST13. Subject to the determination that all the communications have not been completed, the processing of the pertinent session is terminated without disconnecting the radio channel. On the other hand, subject to the determination that all the communications have been completed, the radio channel is disconnected in step ST14, whereupon the processing is terminated.

The processing of the writing routine which is executed in step ST11 in FIG. 5 is as illustrated in the processing flow of FIG. 6. Data is read out of the socket, a header containing the corresponding session number is affixed to the read data, and the resulting data is written into the buffer 306. Subsequently, whether or not the socket continues to exist is determined. When the continuation of the socket has been determined, whether or not data exists is determined. When the existence of the data has been determined, the processing flow returns to the first step, from which the above processing is iterated.

In addition, the processing of the transmission routine 302 in FIG. 3 as is executed in this embodiment is as illustrated in the processing flow of FIG. 7. First, whether or not data is stored in the buffer 306 is determined. Subject to the determination that the data is stored, the data is read out of the buffer 306 and is transferred to the radio channel. Incidentally, when the radio channel is disconnected on this occasion, the data is resent after the re-connection of the radio channel. In contrast, when the radio channel is not disconnected, the data transferred from the buffer 306 is cleared, whereupon the processing flow returns to the first step.

Besides, the processing of the reception routine 303 in FIG. 3, which operates when the client 30 acts as the reception side, is as illustrated in the processing flow of FIG. 8. First, whether or not data from the radio channel exists is determined. Subject to the judgment that the data exists, the data is read out and is written into the reception buffer for merely delivering the data to the memory as explained before. Subsequently, whether or not the radio channel has been disconnected is determined. In case of the disconnection, the radio channel is re-connected. Thereafter, the above processing is iterated.

Besides, the processing of the reading routine, which operates in step ST12 in FIG. 5 when the client 30 acts as the reception side, is as illustrated in the processing flow of FIG. 9. The first step determines whether or not data is stored in the reception buffer for merely delivering the data to the memory as explained before. Subject to the determination that the data is stored, the data is read out of the reception buffer and has its header detached therefrom. Subsequently, whether or not the data is a control packet is determined from the header. When the received data is the control packet, control information designated by the control packet is processed. In contrast, when the received data is not the control packet, that is, when it is communication data, it is sent out to a socket pointed to by a session number. The series of processing explained above is executed while the socket continues to exist.

On the other hand, first of all, the server 40 subjected to the data transmission from the client 30 executes initialization processing and prepares a socket in step ST1 as shown in the processing flow of FIG. 10. Subsequently, the arrival of data at the radio channel is waited in step ST2. When the arrival at the radio channel has been detected, the transmission routine 403 to function as a transmission thread is activated in step ST3, and the reception routine 402 to function as a reception thread is activated in step ST4.

Further, in step ST5, the server 40 waits until port number information is stored in a reception buffer for merely delivering data to a memory as explained above. As long as the port number information is not stored, the processing flow proceeds to step ST6, at which the radio channel is disconnected and which is followed by step ST2. On the other hand, in a case where the port number information is stored, the processing flow proceeds to step ST7, at which the child process 405 is generated in correspondence with a session number.

When the child process 405 has been generated, the socket is extended between the service program 400 of a service request destination and the child process 405 in accordance with the port number information in step ST8. Subsequently, the corresponding relation between the socket and the session number is stored in step ST9.

Subsequently, processing as indicated by step ST11 is executed. Concretely, data sent in through the radio channel is received and is stored into the reception buffer for merely delivering the data to the memory, in accordance with the reception routine 402, while at the same time, the received data is read out of the reception buffer and is thrown into the socket in accordance with a reading routine (which executes the processing of reading from the reception buffer, and which is prepared in correspondence with the reception buffer by way of example). Thus, the received data is transferred to the service program 400.

Here, in a case where the server 40 acts as a transmission side, processing as indicated by step ST10 is executed. Concretely, data to be transmitted is written into a buffer corresponding to the buffer 306 of the client 30, in accordance with a writing routine (which is prepared in correspondence with the buffer by way of example), while at the same time, the data stored in the buffer is transmitted to the client 30 through the radio channel in accordance with the transmission routine 403.

Lastly, the socket is released in step ST12 to terminate the processing of the server 40.

The processing of the reception routine 402 in FIG. 3 as is executed in this embodiment is as illustrated in the processing flow of FIG. 11. First, whether or not the radio channel is disconnected is determined. Subject to the determination that the radio channel is disconnected, a re-connection timer is activated. The next step determines whether or not the radio channel has been re-connected within the preset time period of the re-connection timer. When the re-connection has been determined, the re-connection timer is stopped. More specifically, when the radio channel is disconnected, the client 30 being the transmission side tries to re-connect the radio channel, and hence, the server 40 waits the trial. Meanwhile, when the radio channel is not disconnected as the determination of the first step, it is iterated to execute the processing of receiving data from the radio channel and writing the data into the reception buffer for merely delivering the data to the memory as stated before.

In addition, the processing of the reading routine which is executed in step ST11 in FIG. 10 in this embodiment is as illustrated in the processing flow of FIG. 12. The first step determines whether or not data is stored in the reception buffer for merely delivering the data to the memory. Subject to the determination that the data is stored, the data is read out of the reception buffer and has its header detached therefrom. Subsequently, whether or not the data is a control packet is determined from the header. When the received data is the control packet, control information designated by the control packet is processed. In contrast, when the received data is not the control packet, that is, when it is communication data, it is sent out to a socket pointed to by a session number. The series of processing explained above is executed while the socket continues to exist.

Besides, the processing of the writing routine, which operates in step ST10 in FIG. 10 when the server 40 acts as the transmission side, is as illustrated in the processing flow of FIG. 13. Data is read out of the socket, a header containing the corresponding session number is affixed to the read data, and the resulting data is written into a buffer corresponding to the buffer 306 of the client 30. Subsequently, whether or not the socket continues to exist is determined. When the continuation of the socket has been determined, the processing flow returns to the first step, from which the above processing is iterated.

Besides, the processing of the transmission routine 403 in FIG. 3, which operates when the server 40 acts as the transmission side, is as illustrated in the processing flow of FIG. 14. The first step determines whether or not data is stored in the buffer corresponding to the buffer 306 of the client 30. Subject to the determination that the data is stored, the data is read out of the buffer and is transferred to the radio channel. Incidentally, when the radio channel is disconnected on this occasion, it is re-connected on condition that a re-connection timer does not time over, and the data is resent. In contrast, when the radio channel is not disconnected, the data transferred from the buffer is cleared, whereupon the processing flow returns to the first step.

As thus far described, according to the above embodiments, the resending control for guaranteeing data as proceeds with the protocol of the transport layer is terminated on this side of the radio channel, while the data transmission over the unstable radio channel is carried out by utilizing the protocol of the data link layer of the radio channel. It is accordingly possible to realize enhancement in the throughput of the end-to-end data communications.

Moreover, the apparatus is permitted to operate as the proxy which makes it seem as if the transmission request destination existed therein, to the transmission request source for the data.

Figure 15:
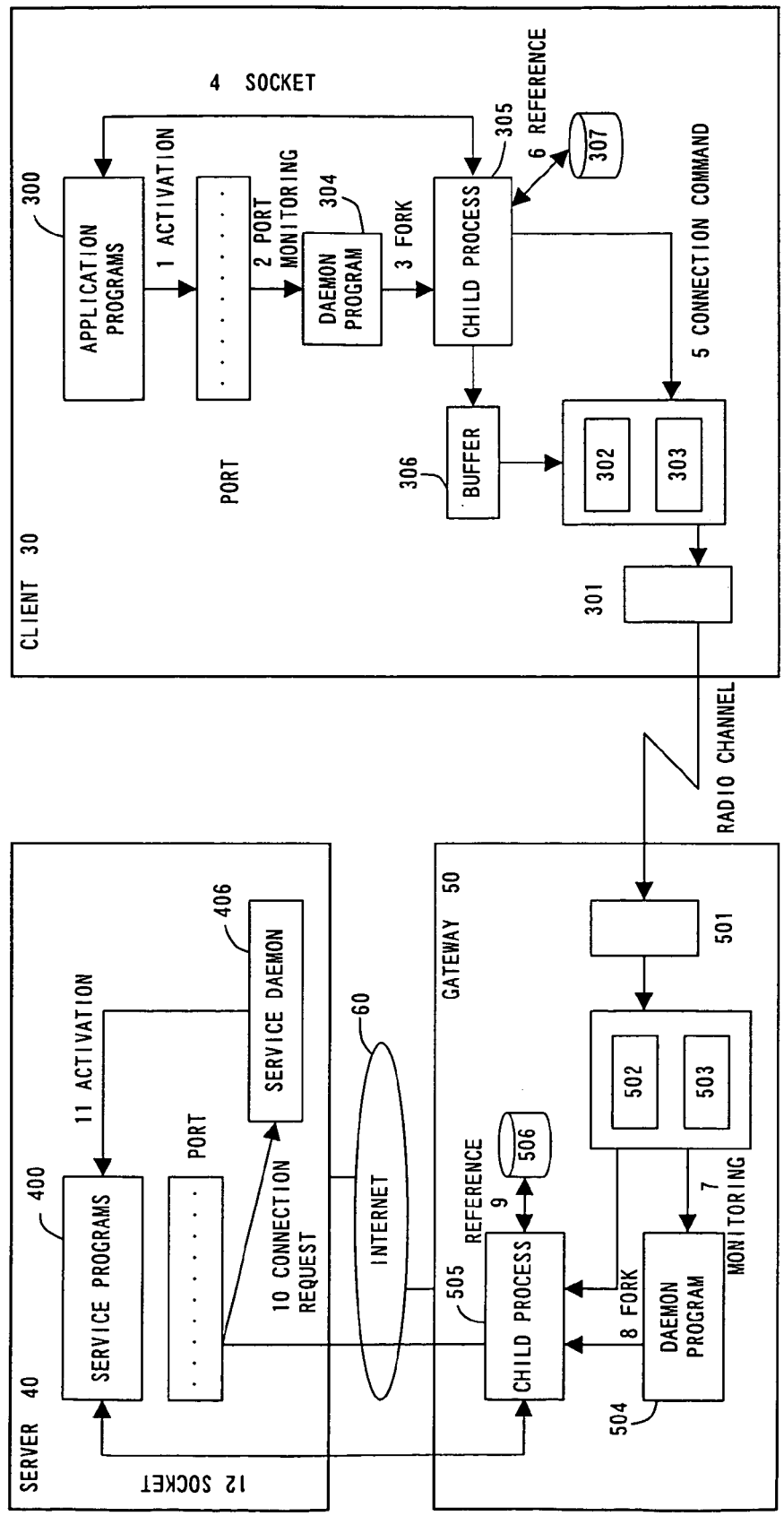
FIG. 15 is a block diagram showing the second embodiment of the present invention.

Now, reference will be had to FIG. 15 showing an information system in the second embodiment of the present invention.

The point of difference of the second embodiment from the first embodiment described in conjunction with FIG. 3 is that, in the first embodiment shown in FIG. 3, the arrival destination of the radio transmission is the server 40 in which the service program 400 is expanded, whereas in the second embodiment, the arrival destination of radio transmission is a gateway 50 to which a server 40 for expanding a service program 400 is connected through the Internet 60.

Owing to the architectural difference, the gateway 50 includes a radio equipment 501, a reception routine 502, a transmission routine 503, a daemon program 504 which monitors whether or not the reception routine 502 has received data (transmitted by a client 30) conforming to a protocol suspended in the layer of a radio channel, and a child process 505 which is generated when the daemon program 504 has detected the reception of the pertinent data and which transfers the data sent in from the client 30, to the service program 400 in accordance with communications of virtual circuit type by the use of a socket extended between this child process 505 and the service program 400.

On the other hand, the server 40 includes a service daemon program 406 which monitors a destination port number accepted by the child process 505 and which activates the service program 400 pointed to by the destination port number.

Further, the client 30 includes a setting file 307 which manages the corresponding relations between port numbers and IP addresses, while the gateway 50 includes a setting file 506 which manages the corresponding relations between the port numbers and the IP addresses.

In the second embodiment of FIG. 15 thus constructed, the client 30 monitors the ports by running a daemon program 304 and waits a connection request from an application program 300.

Under this state, the application program 300 is activated as indicated by "1 activation" in FIG. 15. Then, when a service which is offered by the server 40 is required, the application program 300 issues a service request by designating an address "localhost" for commanding a radio equipment 301 to establish a connection to the particular apparatus itself, together with the port number which specifies the service program 400. Therefore, the daemon program 304 monitors the ports as indicated by "2 port monitoring" in the figure, thereby to monitor whether or not the service request designating the address "localhost" has been issued.

Upon detecting that the application program 300 has issued the service request by designating the address "localhost", the daemon program 304 generates a child process 305 for the intermediation processing of data transfer as indicated by "3 fork" in the figure, by issuing a system call "fork" by way of example, and also generates a buffer 306 in correspondence with the child process 305, in order to transmit data to the server 40. The child process 305 and the buffer 306 are generated in correspondence with a session number which functions as the identification number of the application program 300.

When the child process 305 has been generated, the application program 300 establishes a socket connection between it and the child process 305 as indicated by "4 socket" in the figure, and it transfers the data to be transmitted to the server 40, to the child process 305 by the use of the virtual circuit type communications. Upon accepting the data, the child process 305 commands the radio equipment 301 to establish the connection to the radio channel, as indicated by "5 connection command" in the figure, thereby connecting the radio channel, and it stores the data transferred from the application program 300, in the buffer 306. Then, a transmission routine 302 sends out the data stored in the buffer 306, to the radio equipment 301.

On this occasion, since the address "localhost" is designated, the child process 305 cannot know the IP address of the server 40 connected ahead of the Internet 60. Therefore, the child process 305 obtains the IP address of the server 40 in such a way that, as indicated by "6 reference" in the figure, the setting file 307 is referred to using a search key which is the port number designated by the application program 300.

Upon accepting a transmission command from the child process 305, the radio equipment 301 transmits the stored data of the buffer 306 sent in by the sending-out processing of the transmission routine 302, to the server 40 through the radio channel while performing a resending control in the data link layer of the radio channel, and so forth.

As stated before, the application program 300 of the client 30 has heretofore issued the service request by designating the service program 400 to become the service request destination, for the service daemon program 406 of the server 40, whereas in this embodiment, the application program 300 issues the service request by designating the address "localhost" to function as the IP address of the particular apparatus itself, thereby terminating the protocols TCP/IP on this side of the radio channel. Accordingly, the server 40 cannot activate the service program 400 when left intact.

Figure 16:
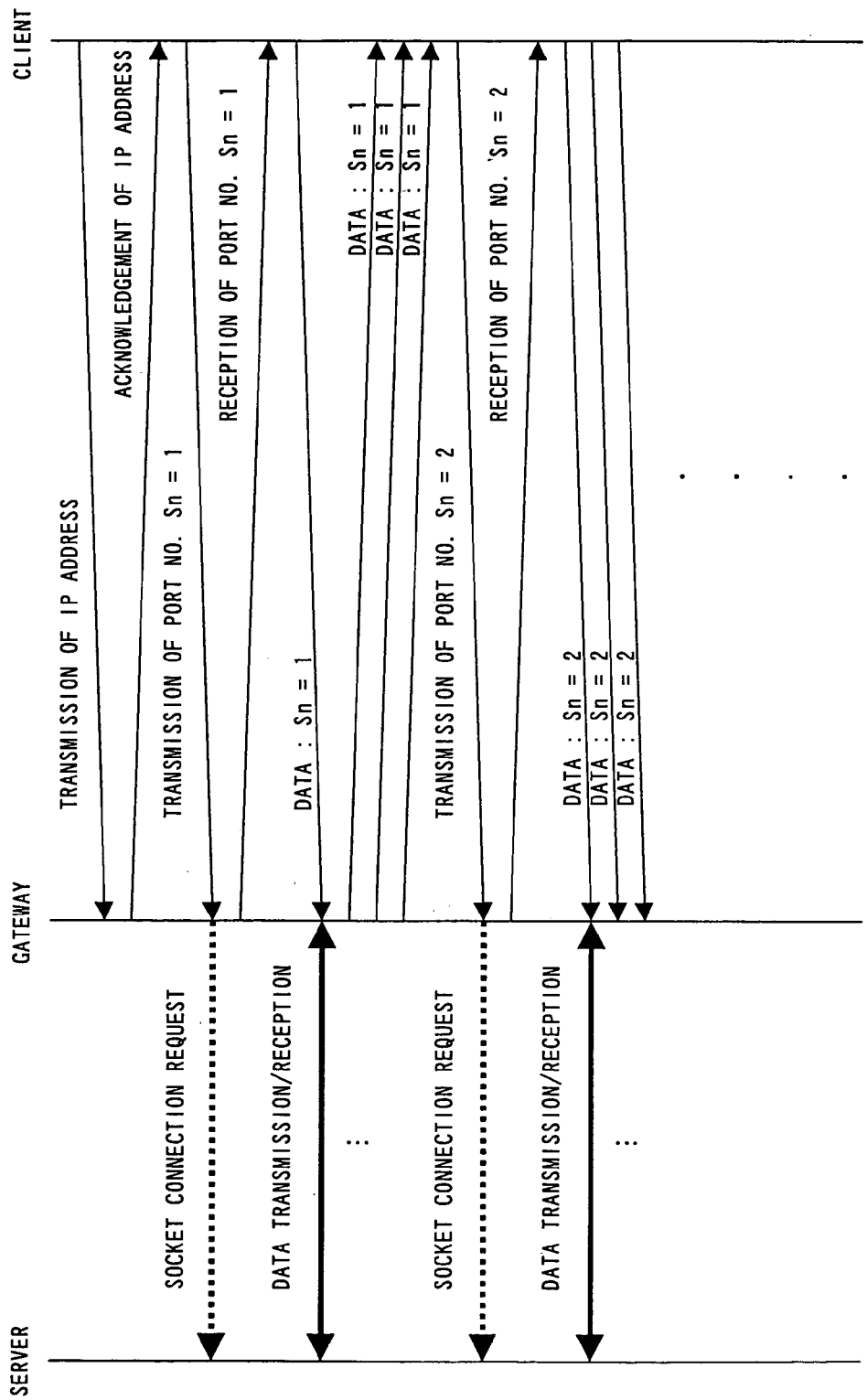
FIG. 16 is a diagram for explaining a communication process.

Therefore, processing as illustrated in FIG. 16 is executed. In issuing a service request to the server 40, the transmission routine 302 sends the gateway 50, for example, the IP address of the server 40 derived from the setting file 307 by the above processing and also the port number designated by the application program 300, as well as the session number (Sn) of the application program 300, before the transmission of data. Subsequently, the client 30 transmits the data.

Herein, on the side of the gateway 50, the daemon program 504 monitors whether or not the reception routine 502 has received data (transmitted by the client 30) conforming to the protocol suspended in the layer of the radio channel, as indicated by "7 monitoring" in FIG. 15. Upon detecting that the reception routine 502 has received the pertinent data, the daemon program 504 generates the child process 505 for accepting the data received by the reception routine 502, as indicated by "8 fork" in the figure and by issuing a system call "fork" by way of example, in order to transfer data to the service program 400.

Here, the child process 505 is generated in correspondence with the session number functioning as the identification number of the application program 300, likewise to the child process 305 of the client 30.

When thus generated, the child process 505 issues a connection request as indicated by "10 connection request" in FIG. 15, for the server 40 pointed to by the IP address sent in from the client 30, while designating the service daemon program 406 specified by the port number sent in from the client 30. As indicated by "11 activation" in the figure, the service daemon program 406 responds to the connection request to activate the service program 400 which offers the service requested by the application program 300.

When the IP address has not been sent in from the client 30, the child process 505 of the gateway 50 obtains the IP address of the server 40 in such a way that, as indicated by "9 reference" in FIG. 15, the setting file 506 is referred to using a search key which is the port number notified by the client 30.

Upon the activation of the service program 400, the child process 505 establishes the socket connection between it and the activated service program 400, as indicated by "12 socket" in the figure, and it transfers the data sent in from the client 30, to the service program 400 by the use of virtual circuit type communications.

In this way, the server 40 of the second embodiment according to the present invention receives the data sent in from the client 30 of the second embodiment according to the present invention.

The second embodiment shown in FIG. 15 has been described on the processing in the case where the client 30 issues the service request and notifies the issue to the server 40. In a case where, in response to the service request, the service program 400 executes the service and returns the result of the service to the application program 300, the transmission processing of the client 30 explained in conjunction with FIG. 15 is executed by the server 40, and the reception processing of the server 40 explained in conjunction with FIG. 15 is executed by the client 30.

Figure 17:
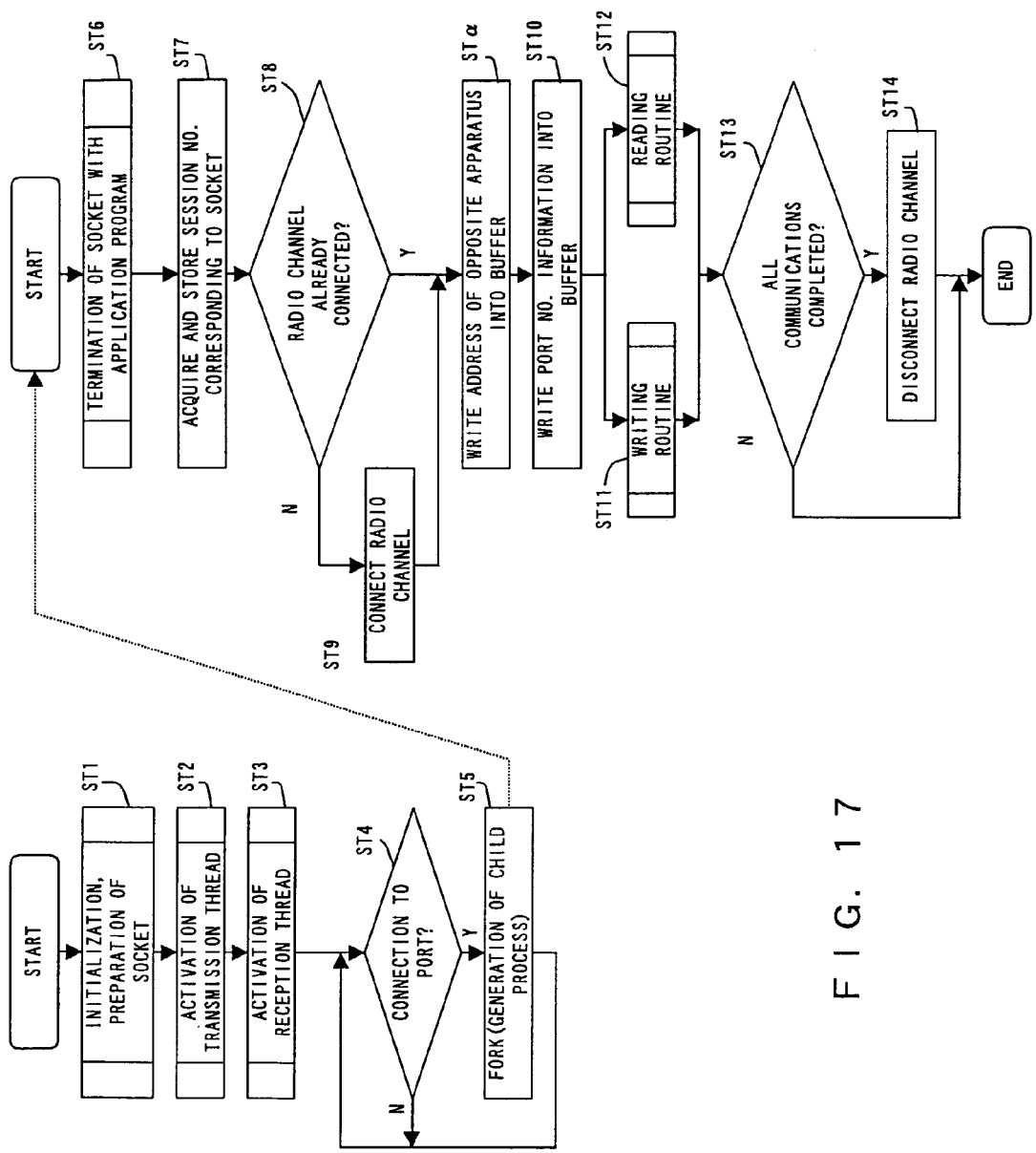
FIG. 17 is a flowchart showing an embodiment of the overall processing flow which is executed by a client 30 in FIG. 15 according to the second embodiment.
Figure 18:
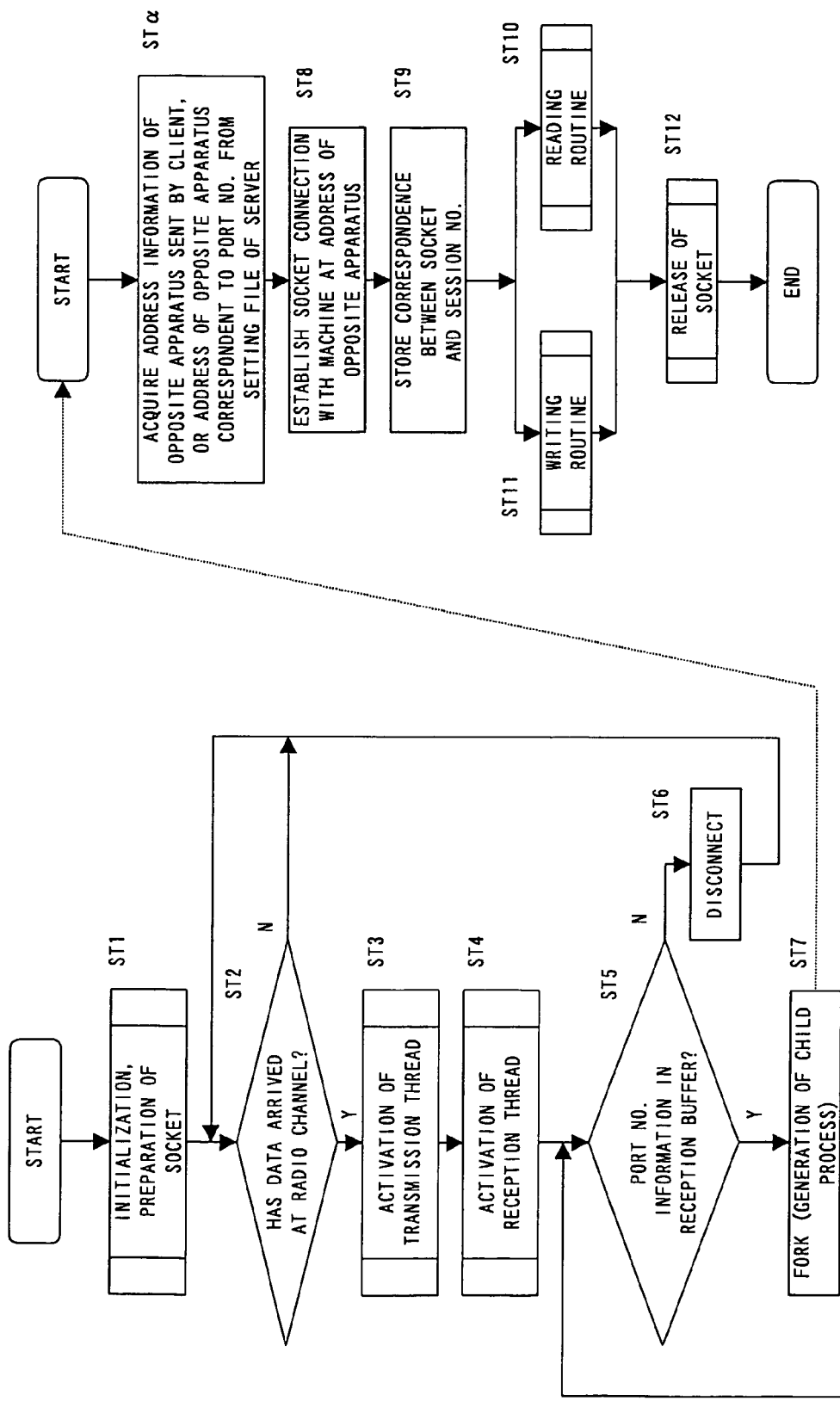
FIG. 18 is a flowchart showing an embodiment of the overall processing flow which is executed by a gateway 50 in FIG. 15 according to the second embodiment.

FIG. 17 illustrates an embodiment of the overall processing flow which is executed by the client 30 of the second embodiment shown in FIG. 15, while FIG. 18 illustrates an embodiment of the overall processing flow which is executed by the gateway 50 of the second embodiment shown in FIG. 15.

The processing flow of FIG. 17 differs from that of FIG. 5 in the point of having step STα between steps ST8, ST9 and step ST10 in the processing flow of FIG. 5. Step STα executes such processing that the IP address of the server 40 is acquired by referring to the setting file 307 by the use of a search key which is a port number designated by the application program 300, and that the acquired IP address is written into the buffer 306.

The processing flow of FIG. 18 and that of FIG. 10 differ in that the former is executed by the gateway 50, whereas the latter is executed by the server 40. Besides, as an essential difference, the processing flow of FIG. 18 has step STα between steps ST7 and ST8 in the processing flow of FIG. 10. Step STα executes either the processing of receiving that IP address of the server 40 which has been sent in from the client 30, or the processing of acquiring that IP address of the server 40 which is not sent in from the client 30, in such a way that the setting file 506 is referred to using a search key which is a port number notified by the client 30.

As stated before, according to the present invention, the enhancement in the throughput of the end-to-end data communications is realized by adopting the contrivance that the resending control for guaranteeing data, which is performed in conformity with the protocol of the transport layer, is once terminated on this side of the radio channel. In order to implement the contrivance, the application program 300 issues the service request by designating the address "localhost" to function as the IP address of the corresponding apparatus itself, as explained before.

For such a method of issuing the service request, according to the second embodiment shown in FIG. 15, the IP address required for the specification of the server 40 including the service program 400, the service of which is requested by the application program 300, is acquired using that setting file 307 of the client 30 or that setting file 506 of the gateway 50 which manages the mapping relations between port numbers and IP addresses.

According to the second embodiment shown in FIG. 15, therefore, the apparatus is permitted to operate as the proxy which makes it seem as if the service program 400 existed therein, to the application program 300.

By the way, in a case where the setting file 307 of the client 30 or the setting file 506 of the gateway 50 is not prepared, the service connected to the server 40 can be received using a host application protocol with a starting point set at the connected gateway 50.

FIG. 19 illustrates the resending processing of data transmission for use in the second embodiment of the present invention.

In the resending processing, when the radio channel disconnected during the data transmission has been re-connected, data items are not transmitted again from the first data item, but data items are resent from the data item which was being transmitted at the time of the disconnection of the radio channel. Thus, efficient data transmission is realized.

Figure 20:
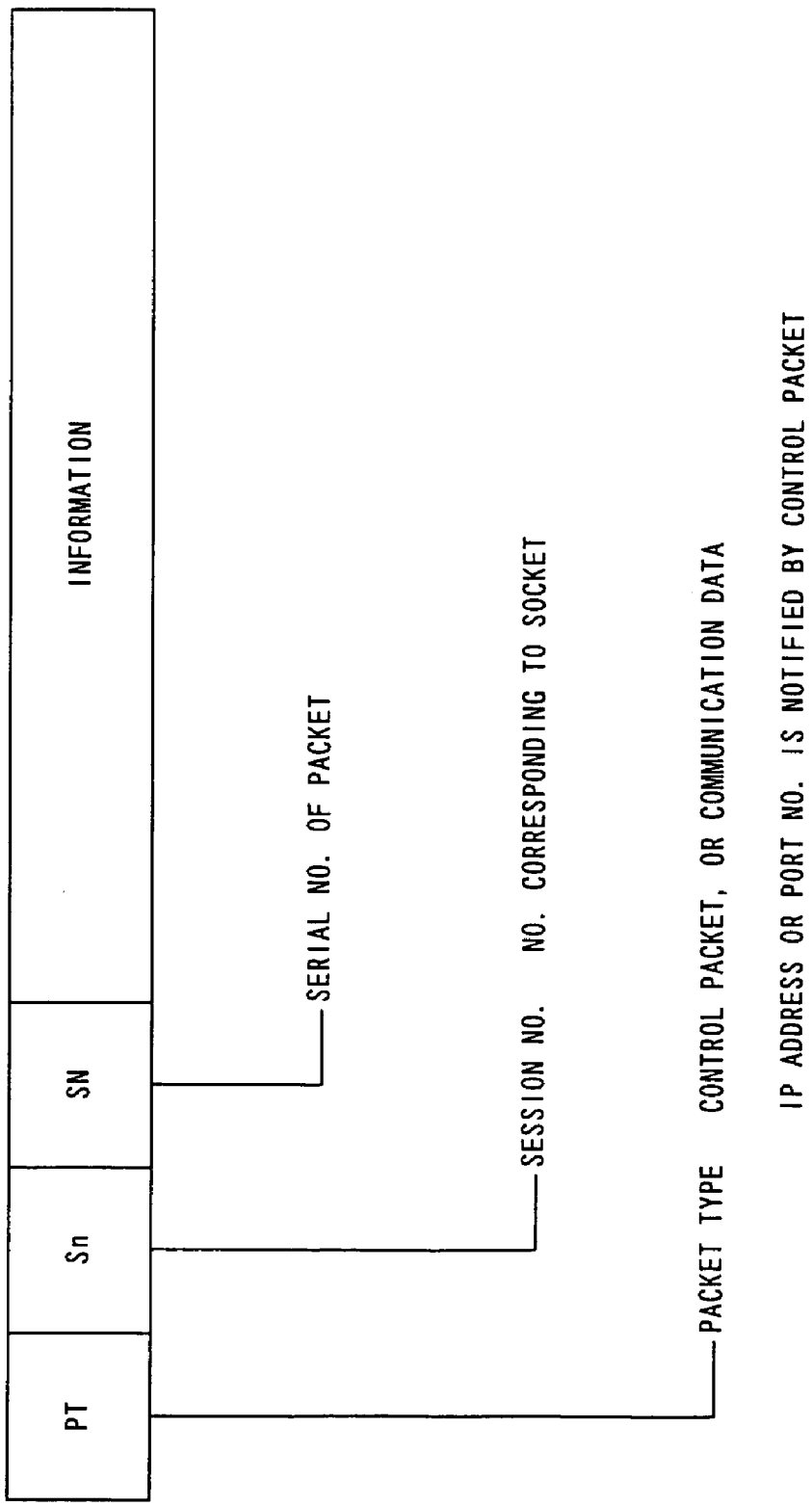
FIG. 20 is a diagram for explaining a format.

In order to implement the resending processing, concretely the format of data is so contrived that the sequence number (SN) of a packet is set in a header as indicated in FIG. 20. As illustrated in FIG. 19, when the radio channel disconnected during the data transmission has been re-connected, the sequence number (SN=2 in the illustrated example) the transmission of which was completed last is notified (transmission of re-connecting SN), and the transmission of data items is thereafter restarted from the data item of the next sequence number (SN= 3 in the illustrated example).

By the way, in a case where the length of data in the format shown in FIG. 20 is greater than a length which can be transmitted at one time over the radio channel, the data is divided and then transmitted. In this case, the following measure should preferably be taken in order that a data part beginning with the header, which was sent till the disconnection of the radio channel, may not be wasted. That is, when the reception side transmits the re-connecting sequence number to the transmission side after the re-connection of the radio channel, it transmits a received length together. The transmission side is accordingly permitted to reconstruct the original data.

The resending processing will be described in detail with reference to processing flows shown in FIGS. 21 through 24.

Figure 22:
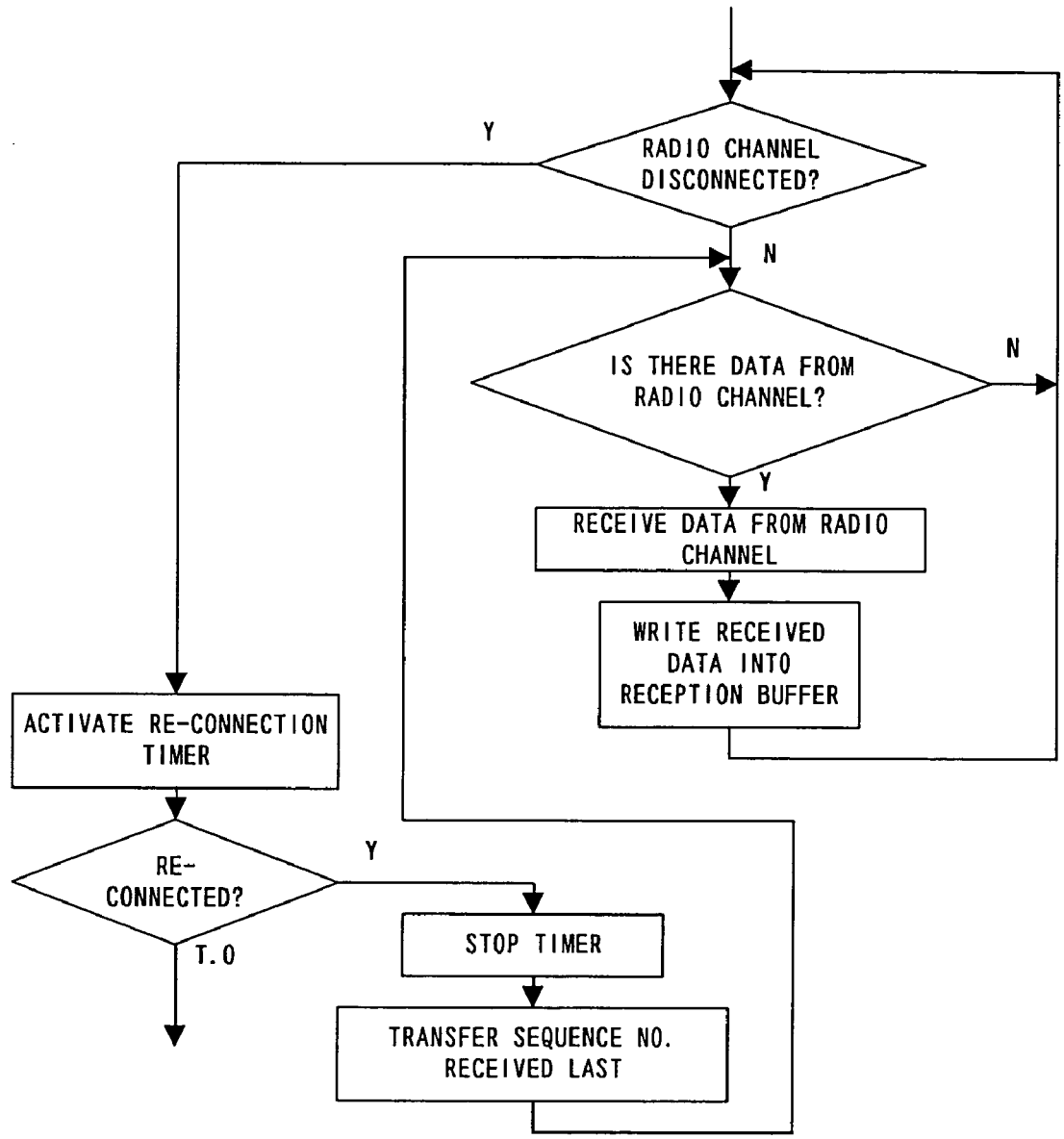
FIG. 22 is a flowchart showing an embodiment of a processing flow which is executed by the reception routine 502 in FIG. 15 of the gateway 50.
Figure 24:
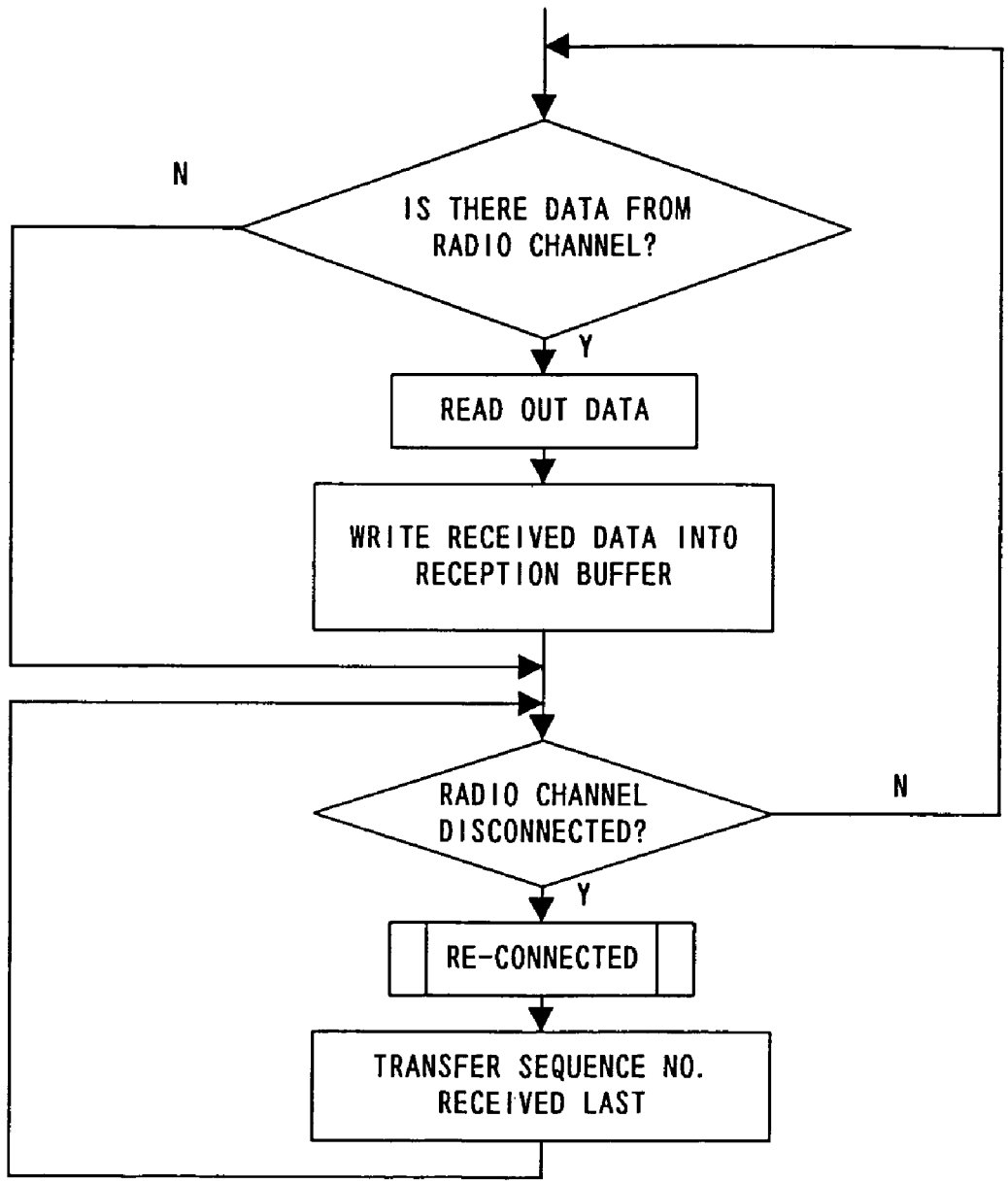
FIG. 24 is a flowchart showing an embodiment of a processing flow which is executed by the reception routine 303 in FIG. 15 of the client 30.

Here, FIG. 21 illustrates an embodiment of the processing flow which is executed by the transmission routine 302 of the client 30, FIG. 22 illustrates an embodiment of the processing flow which is executed by the reception routine 502 of the gateway 50, FIG. 23 illustrates an embodiment of the processing flow which is executed by the transmission routine 503 of the gateway 50, and FIG. 24 illustrates an embodiment of the processing flow which is executed by the reception routine 303 of the client 30.

As shown in the processing flow of FIG. 21, when the transmission routine 302 of the client 30 transmits data to the gateway 50, it determines whether or not data is stored in the buffer 306. Subject to the determination that the data is stored, the transmission routine 302 reads the data out of the buffer 306 while affixing a sequence number thereto and transmits the resulting data toward the gateway 50 through the radio channel. On this occasion, when the radio channel is disconnected, it is re-connected. Thereafter, the sequence number of data received last by the gateway 50, this sequence number being notified by the gateway 50, is received, and the transmission is restarted from data having a sequence number next to the notified sequence number. On the other hand, when the radio channel is not disconnected, the data transmitted from the buffer 306 to the gateway 50 is cleared, and the sequence number is incremented by "1" (one), whereupon the processing flow returns to the first step.

As shown in the processing flow of FIG. 22, in response to the transmission processing of the transmission routine 302 of the client 30, the reception routine 502 of the gateway 50 determines whether or not the radio channel is disconnected. When the disconnection of the radio channel has been determined, a re-connection timer is activated, followed by determining whether or not the radio channel has been re-connected within the set time period of the re-connection timer. Subject to the determination of the re-connection, the re-connection timer is stopped, and the sequence number of data received last is notified to the client 30. On the other hand, when the radio channel is not disconnected as the determination of the first step, data from the radio channel is received, and the received data is written into the reception buffer for merely delivering the data to the memory as explained before, whereupon the processing flow returns to the first step.

Meanwhile, as shown in the processing flow of FIG. 23, when the transmission routine 503 of the gateway 50 sends data from the server 40, back to the client 30, it determines whether or not data is stored in the buffer corresponding to the buffer 306 of the client 30. Subject to the determination that the data is stored, the transmission routine 503 reads the data out of the buffer while affixing a sequence number thereto and transmits the resulting data toward the client 30 through the radio channel. When the radio channel is disconnected on this occasion, it is reconnected on condition that a re-connection timer does not time over. After the re-connection, the re-connection timer is stopped. Subsequently, a sequence number received last as notified by the client 30 is received, and the transmission is restarted from data having a sequence number next to the notified sequence number. On the other hand, when the radio channel is not disconnected, the data transferred from the buffer is cleared, and the sequence number is incremented by "1" (one), whereupon the processing flow returns to the first step.

As shown in the processing flow of FIG. 24, in response to the transmission processing of the transmission routine 503 of the gateway 50, the reception routine 303 of the client 30 determines whether or not data from the radio channel exists. Subject to the determination that the data exists, the data is read out and is written into the reception buffer for merely delivering the data to the memory as explained before. Subsequently, whether or not the radio channel has been disconnected is determined. In case of the disconnection, the radio channel is re-connected. Thereafter, the sequence number of data received last is notified to the gateway 50.

In this way, according to the resending processing shown in FIG. 19, after the radio channel disconnected during the data transmission has been re-connected, data items are not transmitted again from the first data item, but data items are resent from the data item which was being transmitted at the time of the disconnection of the radio channel. Thus, efficient data transmission is realized.

Figure 25:
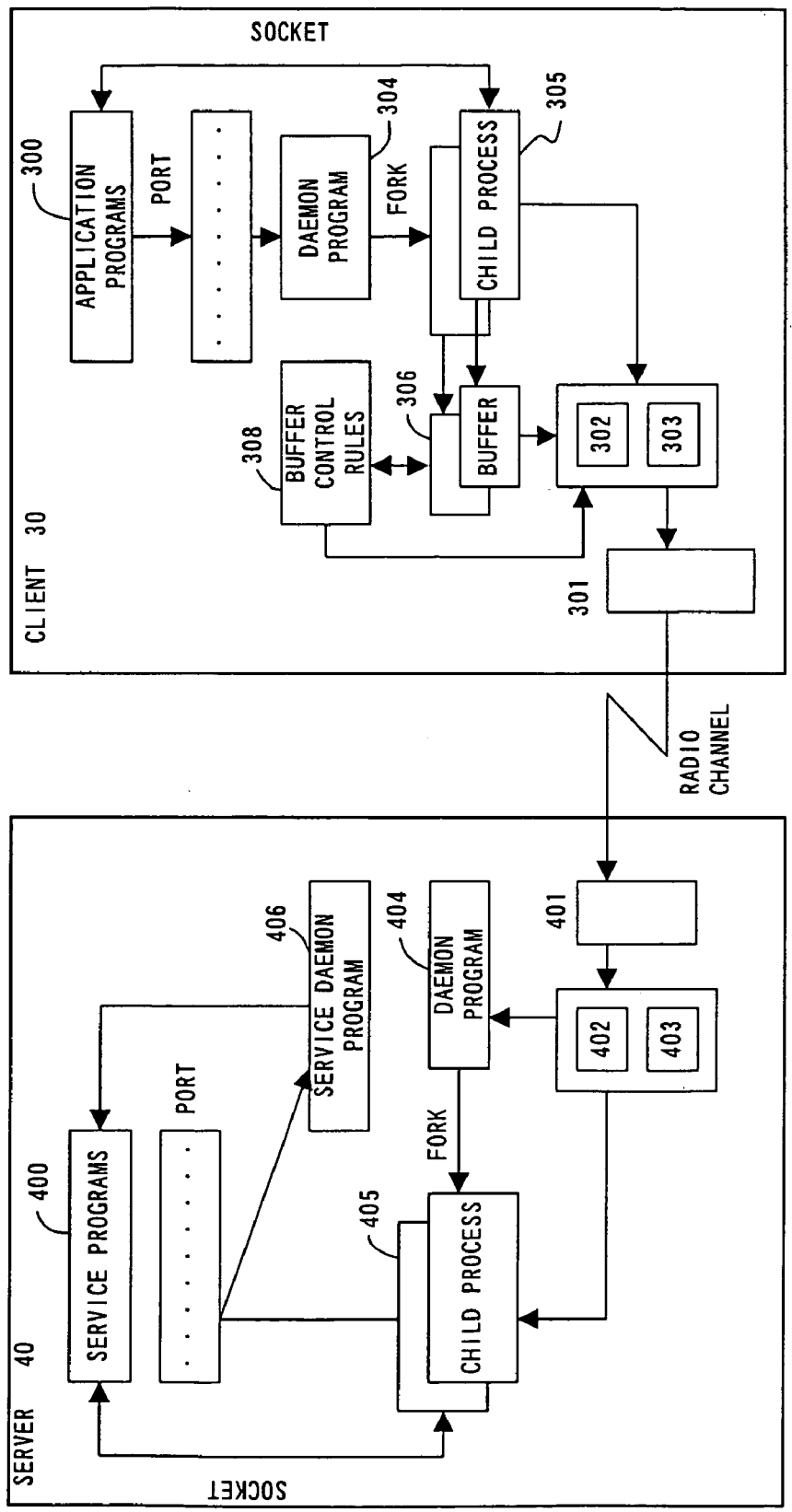
FIG. 25 is a block diagram showing the third embodiment of the present invention.

FIG. 25 illustrates the architecture of an information system in the third embodiment of the present invention. Incidentally, although only one application program 300 is shown in the figure, actually a plurality of application programs may well be existent.

As explained in the first embodiment shown in FIG. 3, the child processes 305 of the client 30 are respectively generated in correspondence with the session numbers which function as the identification numbers of the individual application programs 300. Consequently, also the child processes 405 of the server 40 are respectively generated in correspondence with the session numbers which function as the identification numbers of the individual application programs 300.

As seen from the third embodiment shown in FIG. 25, accordingly, the buffers 306 which are generated in correspondence with the child processes 305 of the client 30 are also respectively generated in correspondence with the session numbers which function as the identification numbers of the individual application programs 300. Reception buffers (not shown) for merely delivering data to a memory device as explained before, the reception buffers being included in the server 40, are also respectively generated in correspondence with the session numbers which function as the identification numbers of the individual application programs 300.

The third embodiment shown in FIG. 25 is therefore contrived so as to realize an appropriate data transmission, in such a way that buffer control rules 308 which define a method of reading data out of the plurality of buffers 306 are stipulated on the side of the client 30 acting as a transmission side.

The buffer control rules 308 manage, for example, priority levels which are respectively allotted to the individual application programs 300. Thus, they command the transmission routine 302 to transmit data successively from the buffers 306 of higher priority levels. Alternatively, they command the transmission routine 302 to transmit data while setting the transmission cycles of the buffers 306 of higher priority levels shorter.

Figure 26:
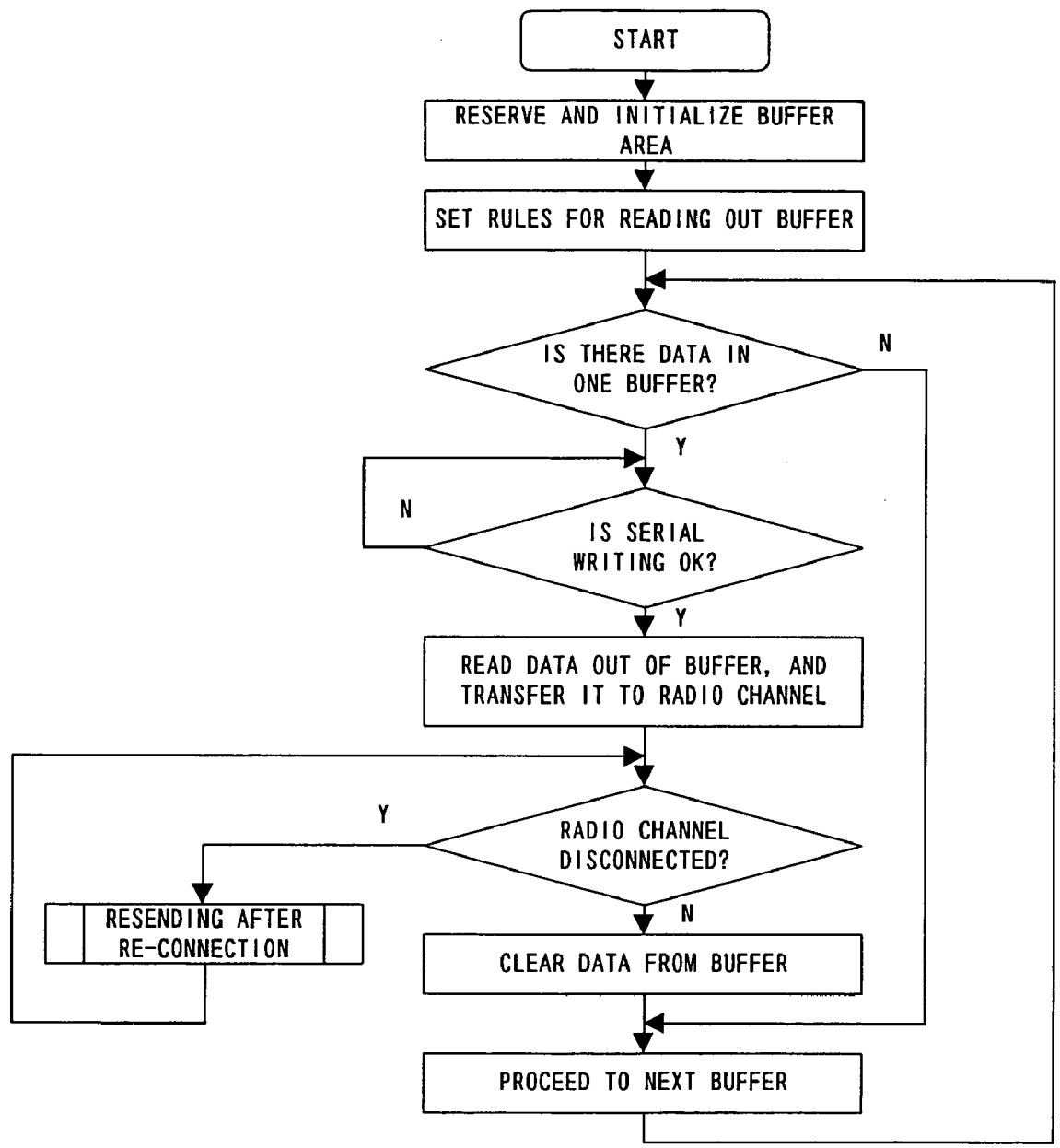
FIG. 26 is a flowchart showing an embodiment of a processing flow which is executed by the transmission routine 302 in FIG. 25 of a client 30 in FIG. 25 according to the third embodiment.

FIG. 26 illustrates an embodiment of a processing flow which is executed by the transmission routine 302 of the client 30 in the third embodiment.

According to the third embodiment, as seen from the processing flow shown in FIG. 26, the transmission routine 302 of the client 30 reserves a buffer area on a memory and initializes the reserved area. Then, the transmission routine 302 sets rules for reading out the buffers 306, in compliance with a command given by the buffer control rules 308. Subsequently, the transmission routine 302 determines whether or not data is stored in one of the buffers 306. Subject to the determination that the data is stored, the transmission routine 302 waits until the data is permitted to be read out, and it reads the data out of the buffer 306 and transfers the read data to the radio channel. When the radio channel is disconnected on this occasion, the data is resent after the re-connection of the radio channel. In contrast, when the radio channel is not disconnected, the data transferred from the buffer 306 is cleared, and the next buffer 306 designated by the buffer reading-out rules is thereafter set as a subject for transmission.

On the other hand, when the server 40 acts as a transmission side, the transmission routine 403 thereof executes a processing flow illustrated in FIG. 27.

As seen from the processing flow shown in FIG. 27, the transmission routine 403 of the server 40 reserves a buffer area on a memory and initializes the reserved area. Then, the transmission routine 403 sets rules for reading out buffers (corresponding to the buffers 306 of the client 30), in compliance with a command given by buffer control rules (not shown). Subsequently, the transmission routine 403 determines whether or not data is stored in one of the corresponding buffers. Subject to the determination that the data is stored, the transmission routine 403 waits until the data is permitted to be read out, and it reads the data out of the buffer and transfers the read data to the radio channel. When the radio channel is disconnected on this occasion, it is re-connected on condition that a re-connection timer does not time over. After the re-connection, the re-connection timer is stopped, and the data is resent. In contrast, when the radio channel is not disconnected, the data transferred from the buffer is cleared, and the next buffer designated by the buffer reading-out rules is thereafter set as a subject for transmission.

According to the third embodiment shown in FIG. 25, the data of the application programs 300 endowed with higher priority levels can be preferentially transmitted to the server 40.

Figure 28:
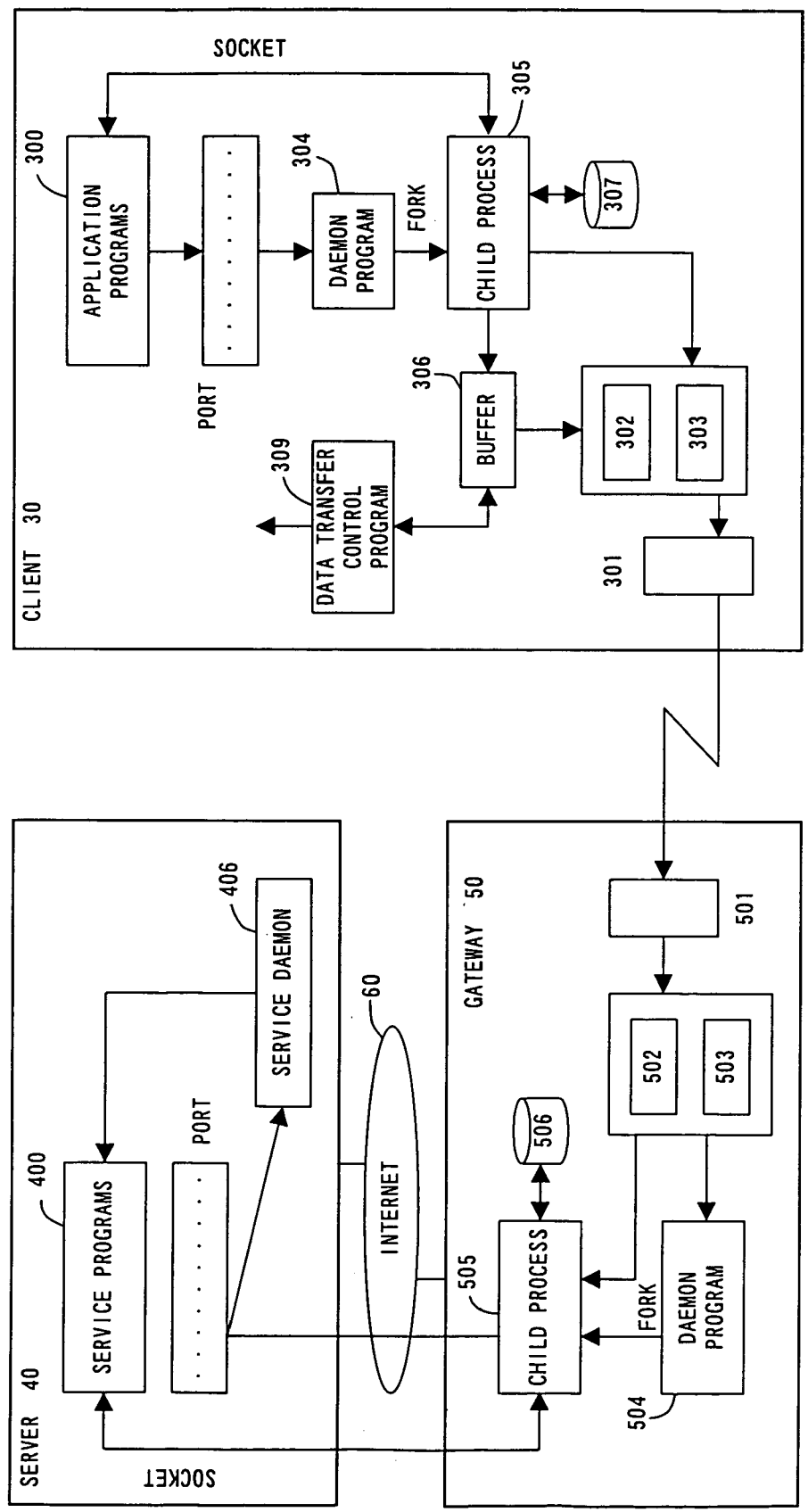
FIG. 28 is a block diagram showing the fourth embodiment of the present invention.

FIG. 28 illustrates the architecture of an information system in the fourth embodiment of the present invention.

In addition to the various constituents of the second embodiment shown in FIG. 15, the fourth embodiment includes a data transfer control program 309 which is installed in the client 30 acting as a data transmission side, and which monitors the data storing state of the buffer 306 and controls the transfer speed of data to be transferred from the application program 300 to the child process 305, on the basis of the monitored result.

If the memory capacity of the buffer 306 can be enlarged sufficiently, this buffer 306 does not overflow with data which are transferred from the child process 305. However, in a case where the enlargement of the memory capacity of the buffer 306 is restricted, this buffer 306 overflows with the data which are transferred from the child process 305. The fourth embodiment shown in FIG. 28 is furnished with the data transfer control program 309 in order to eliminate such a drawback.

FIG. 29 illustrates embodiments of a processing flow which is executed by the data transfer control program 309.

As seen from the processing flow shown at (a) in FIG. 29, when the application program 300 is activated, the data transfer control program 309 starts processing so as to determine whether or not data stored in the buffer 306 has exceeded a threshold value. Subject to the determination that the threshold value has been exceeded, the control program 309 calculates a delay time for issuing an ACK (reception acknowledgement) in socket communications, from the remaining capacity of the buffer 306. Further, the control program 309 commands the child process 305 to issue the ACK to the application program 300 in accordance with the calculated delay time. Thus, the data transfer speed of the socket communications of virtual circuit type between the application program 300 and the child process 305 is controlled so as to become lower.

Alternatively, as seen from the processing flow shown at (b) in FIG. 29, when the application program 300 is activated, the data transfer control program 309 starts processing so as to determine whether or not data stored in the buffer 306 has exceeded a threshold value. Subject to the determination that the threshold value has been exceeded, the control program 309 calculates a window size (the size of data which the application program 300 can transfer without waiting an ACK) from the remaining capacity of the buffer 306. Further, the control program 309 commands the application program 300 to transfer the data in accordance with the window size. Thus, the data transfer speed of the communications of virtual circuit type is controlled so as to become lower.

In this way, according to the fourth embodiment shown in FIG. 28, even when the memory capacity of the buffer 306 cannot be enlarged, the transmission of data can be controlled so that the buffer 306 may not overflow with data.

Figure 30:
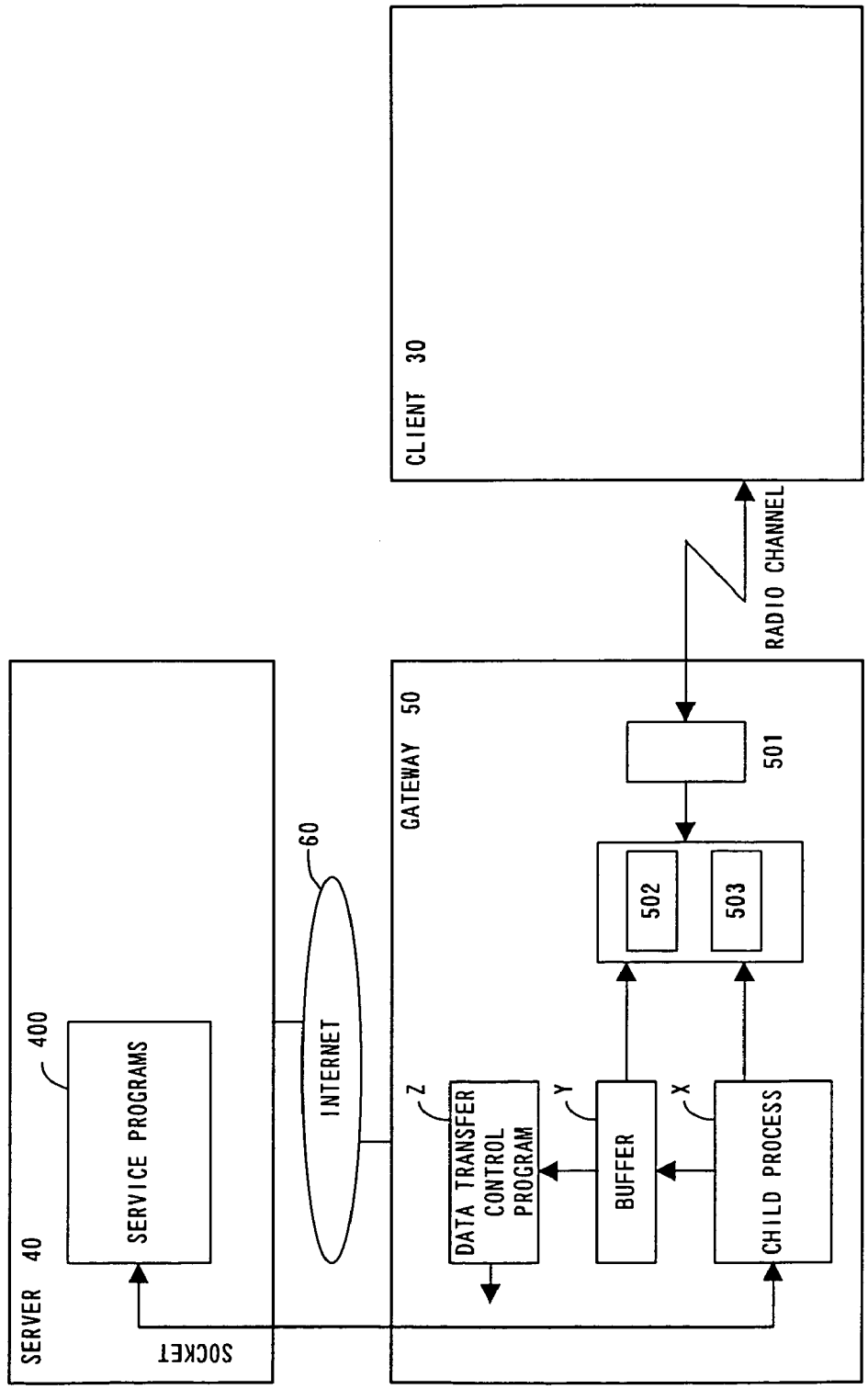
FIG. 30 is a block diagram showing the fifth embodiment of the present invention.

Although the data transfer control program 309 is installed in the client 30 in the fourth embodiment of FIG. 28, actually a similar data transfer control program (Z in FIG. 30) will be often installed on the side of the gateway 50 which sends data back to the client 30, as in the fifth embodiment illustrated in FIG. 30. Incidentally, a child process X shown in FIG. 30 is generated when the gateway 50 acts as a transmission side, while a buffer Y is generated when the gateway 50 acts as the transmission side. In this case, the data transfer control program Z commands the child process X to issue an ACK to the service program 400 of the server 40 in accordance with a designated delay time, or it commands the service program 400 to transfer data to the buffer Y in accordance with a designated window size. Thus, the data transfer speed of the virtual circuit type communications between the service program 400 and the child process X is controlled so as to become lower.

Figure 31:
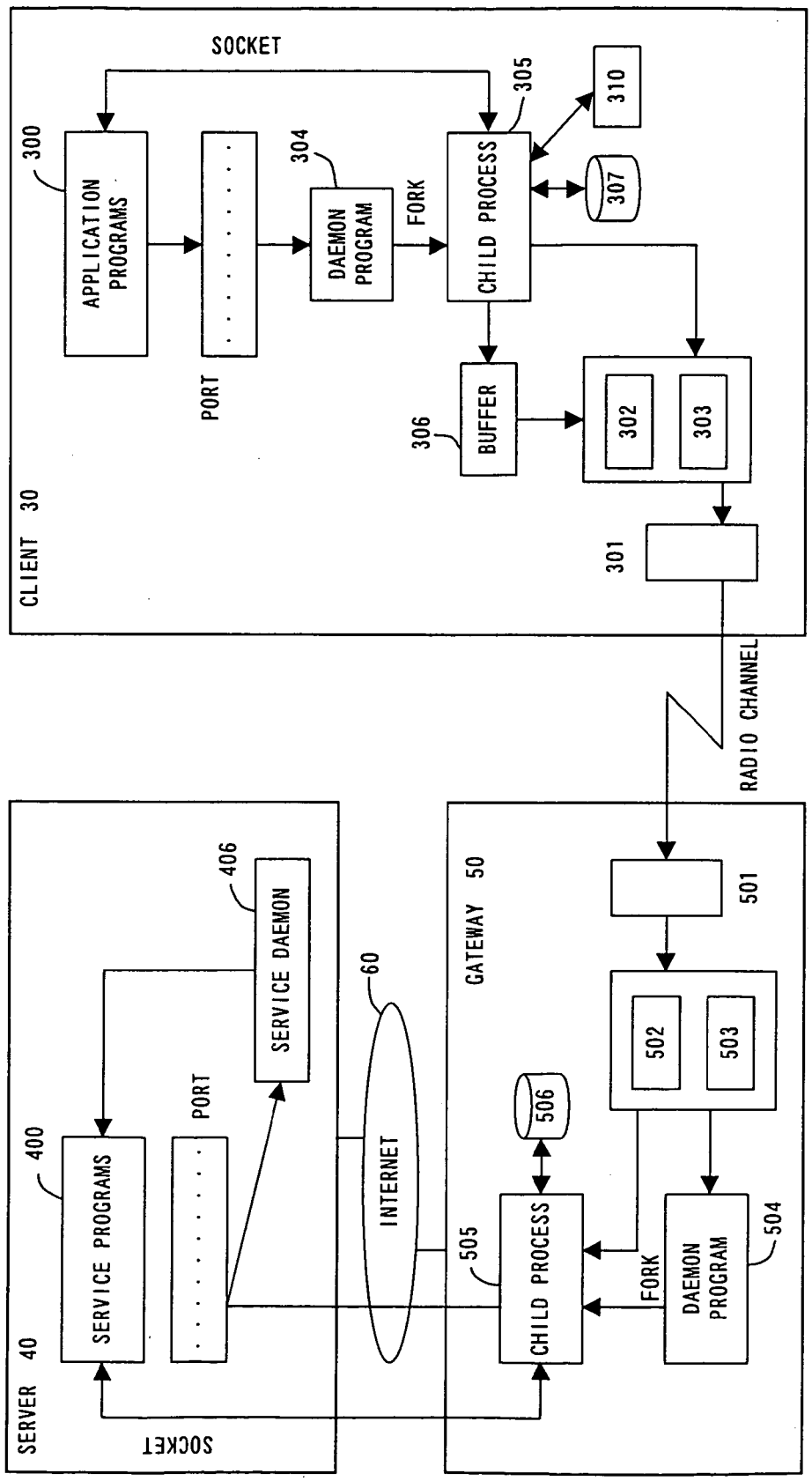
FIG. 31 is a block diagram showing the sixth embodiment of the present invention.
Figure 32:
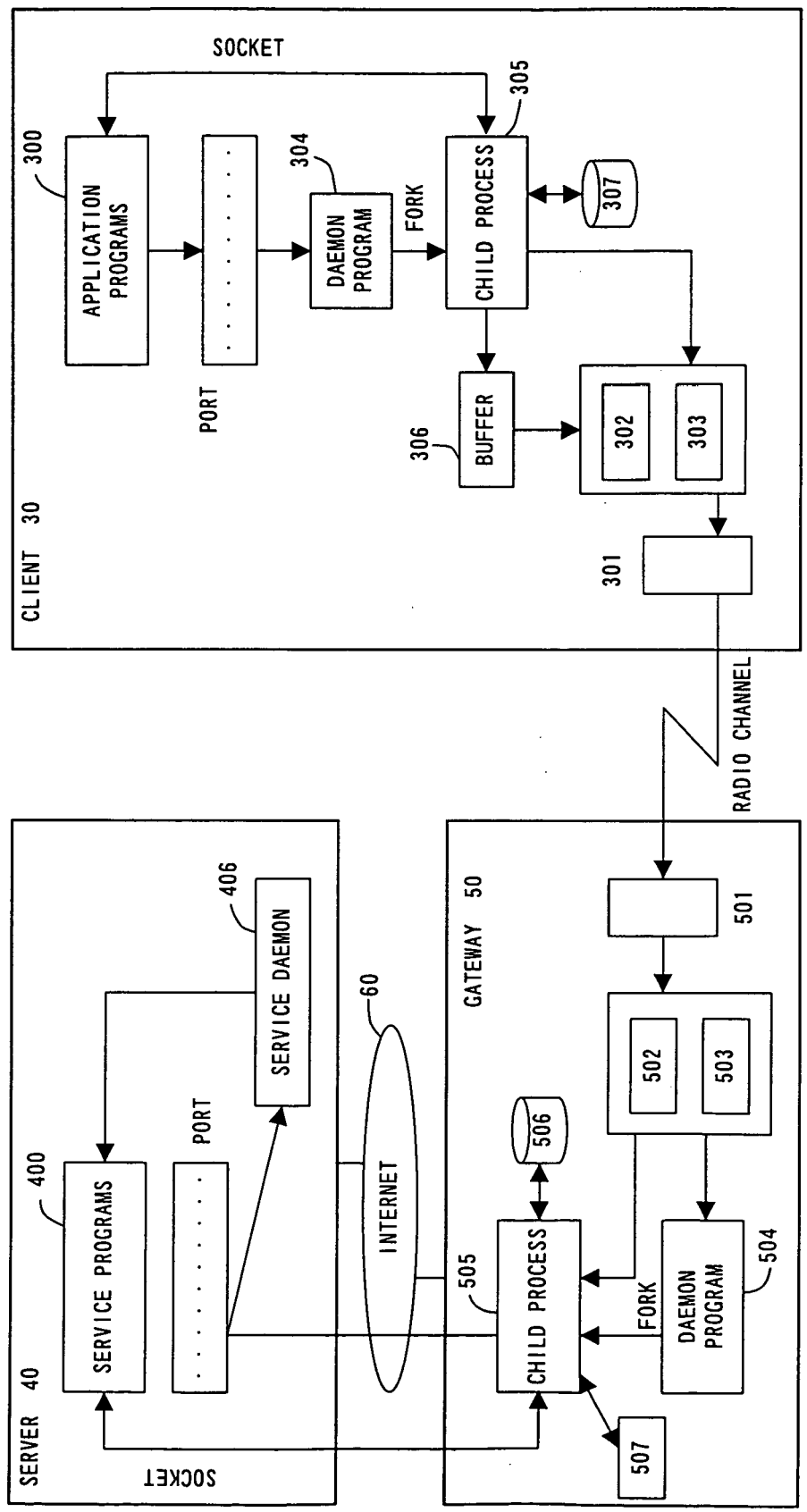
FIG. 32 is a block diagram showing the seventh embodiment of the present invention.

FIGS. 31 and 32 illustrate the sixth and seventh embodiments of the present invention, respectively.

In addition to the various constituents of the second embodiment shown in FIG. 15, the sixth embodiment shown in FIG. 31 includes a cache memory 310 which is installed in the client 30, and which stores therein the mapping relations between data items obtained from the server 40 and request messages for the data items. Thus, in a case where a data request message issued by the application program 300 designates data registered in the cache memory 310, the child process 305 in the client 30 can notify the pertinent data in the cache memory 310, to the application program 300 without the access of the client 30 to the server 40.

Further, in addition to the various constituents of the second embodiment shown in FIG. 15, the seventh embodiment shown in FIG. 32 includes a cache memory 507 which is installed in the gateway 50, and which stores therein the mapping relations between data items obtained from the server 40 and request messages for the data items. Thus, in a case where a data request message issued by the application program 300 designates data registered in the cache memory 507, the child process 505 in the gateway 50 can read the pertinent data out of the cache memory 507 and notify the read data to the application program 300 without the access of the gateway 50 to the server 40.

According to the sixth or seventh embodiment, traffic on the network such as the radio channel or the Internet 60 can be relieved.

Figure 33:
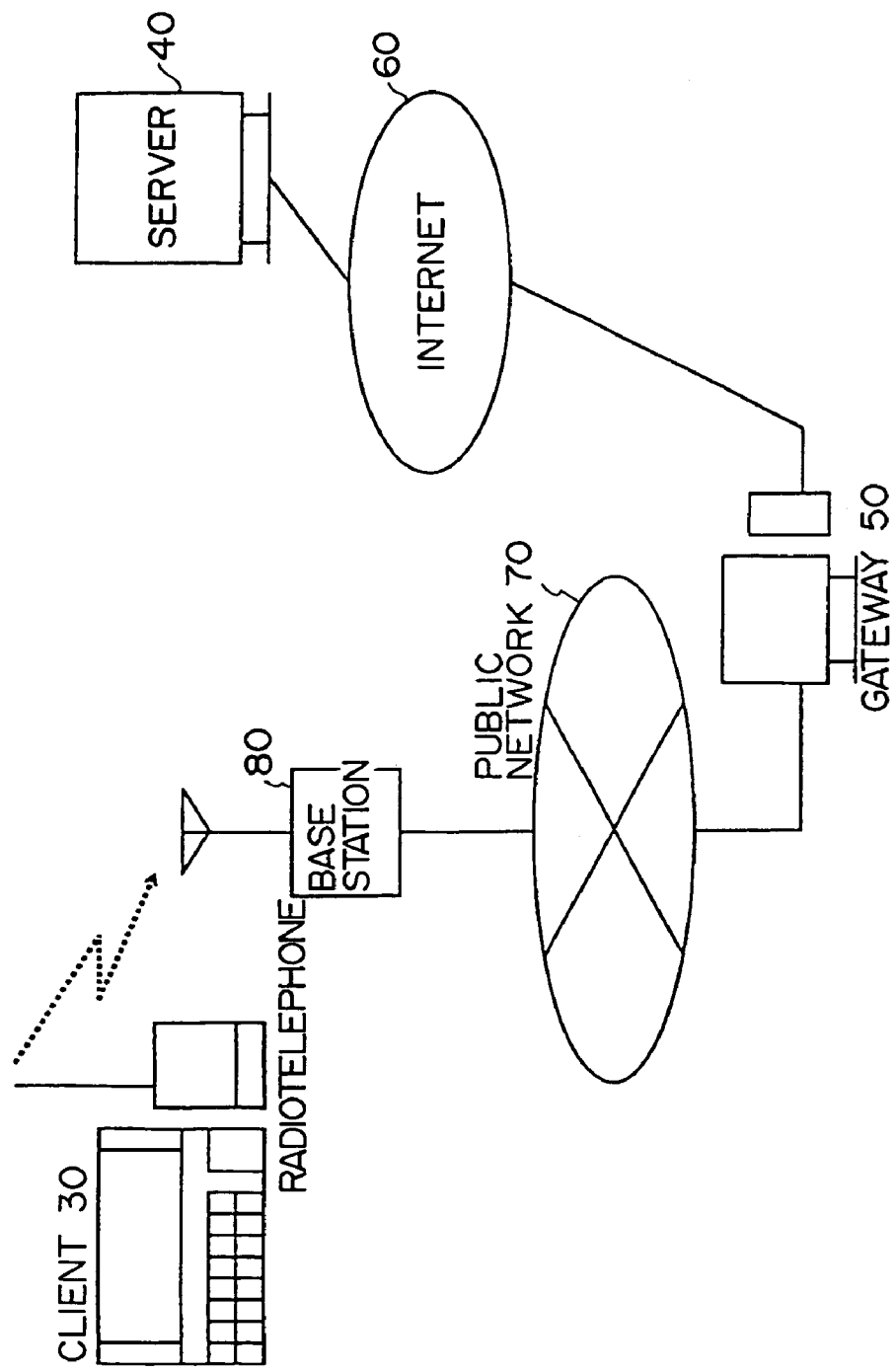
FIG. 33 is a diagram for explaining a system to which the present invention is applied.

Consequently, according to the sixth or seventh embodiment, the throughput of the data communications between the client 30 and the server 40 can be enhanced in a case where, using the radio channel, the client 30 accesses an information system as shown in FIG. 33, which is constructed by connecting the server 40 and the gateway 50 to the Internet 60 and also connecting this gateway 50 and the base station 80 of a radio communication network to a public network 70.

Although the present invention has been described above in detail in conjunction with the illustrated embodiments, it is not restricted thereto. By way of example, the protocols TCP and IP have been mentioned as concrete examples in the embodiments, but the present invention is directly applicable to cases of employing protocols which are different from the TCP and IP and which perform the resending control of data in a transport layer.

What is claimed is:

1. A transmission apparatus for use in a radio communication system wherein the transmission apparatus communicates with a reception apparatus through a radio channel, said transmission apparatus comprising:

monitoring means for monitoring whether or not a transmission request for data, designating the transmission apparatus itself as a transmission destination, has been issued by said transmission apparatus or the reception apparatus connected thereto through a network;

generation means for generating and initiating a process in the transmission apparatus to serve as a logical reception destination for the data and generating a buffer in correspondence with the process, when said monitoring means has detected the issue of the transmission request;

transfer means for transferring the data from a transmission request source to said process in accordance with communications of an internal virtual circuit type, so as to store in the buffer the data transmitted by the transmission request source; and transmission means for transmitting the data stored in said buffer, to said reception apparatus through the radio channel;

wherein when a plurality of such buffers are generated by said generation means, said transmission means reads out data successively from the buffers of higher priority levels in accordance with priority levels set for the respective buffers and transmits the read data.

2. A transmission apparatus for use in a radio communication system as defined in claim 1, further comprising;

a detection means for detecting a data storing state of said buffer; and wherein said transfer means controls a communication speed of the internal virtual circuit type communications in accordance with a detected result of said detection means.

3. A transmission apparatus for use in a radio communication system as defined in claim 1, further comprising:

a detection means for detecting a data storing state of said buffer;

wherein said transmission means transmits transmission destination information to be designated, in accordance with a protocol of an upper layer with respect to layers of said radio channel, and wherein said transfer means controls a communication speed of the virtual circuit type communications in accordance with a detected result of said detection means.

4. The transmission apparatus for use in a radio communication system as defined in claim 2, further comprising:

specification means for specifying a sequence number of the transmission data at a point of time of the disconnection, when said radio channel has been disconnected;

wherein said transmission means restarts the data transmission from said data of the sequence number specified by said specification means, when said radio channel has been re-connected.

5. The transmission apparatus for use in a radio communication system as defined in claim 3, further comprising:

specification means for specifying a sequence number of the transmission data at a point of time of the disconnection, when said radio channel has been disconnected;

wherein said transmission means restarts the data transmission from said data of the sequence number specified by said specification means, when said radio channel has been re-connected.

6. A transmission apparatus for use in a radio communication system wherein the transmission apparatus communicates with a reception apparatus through a radio channel, said transmission apparatus comprising:

monitoring means for monitoring whether or not a transmission request for data, designating the transmission apparatus itself as a transmission destination, has been issued by said transmission apparatus or the reception apparatus connected thereto through a network;

generation means for generating and initiating a process in the transmission apparatus to serve as a logical reception destination for the data and generating a buffer in correspondence with the process, when said monitoring means has detected the issue of the transmission request;

transfer means for transferring the data from a transmission request source to said process in accordance with communications of an internal virtual circuit type, so as to store in the buffer the data transmitted by the transmission request source; and transmission means for transmitting the data stored in said buffer, to said reception apparatus through the radio channel;

wherein when a plurality of such buffers are generated by said generation means, said transmission means transmits data while setting transmission cycles of the data stored in the buffers of higher priority levels, shorter in accordance with priority levels set for the respective buffers.

7. A transmission apparatus for use in a radio communication system wherein the transmission apparatus communicates with a reception apparatus through a radio channel, said transmission apparatus comprising:

monitoring means for monitoring whether or not a transmission request for data, designating the transmission apparatus itself as a transmission destination, has been issued by said transmission apparatus or the reception apparatus connected thereto through a network;

generation means for generating and initiating a process in the transmission apparatus to serve as a logical reception destination for the data and generating a buffer in correspondence with the process, when said monitoring means has detected the issue of the transmission request;

transfer means for transferring the data from a transmission request source to said process in accordance with communications of an internal virtual circuit type, so as to store in the buffer the data transmitted by the transmission request source;

transmission means for transmitting the data stored in said buffer, to said reception apparatus through the radio channel;

a cache memory which stores therein data sent back in response to the data transmission of said transmission means; and search means for searching as to whether or not data requested by said transmission request source is registered in said cache memory;

wherein when the registration of the requested data in said cache memory has been detected by said search means, said process transfers said requested data in said cache memory, to said transmission request source through said transfer means.

8. A reception apparatus for use in a radio communication system wherein the reception apparatus communicates with a transmission apparatus through a radio channel, said reception apparatus comprising:

reception means for receiving data sent in through the radio channel;

monitoring means for monitoring whether or not said reception means has received data which conforms to a protocol suspended in layers of said radio channel;

generation means for generating and initiating a process in the transmission apparatus to serve as a logical reception destination for the data, when said monitoring means has detected the reception of the pertinent data;

transfer means for transferring the data received by the process, to a transmission request destination in accordance with communications of an internal virtual circuit type a cache memory which stores therein data sent back from the transmission request destination in response to the data transfer of said transfer means;

search means for searching as to whether or not data requested by the data sent in through said radio channel is registered in said cache memory; and transmission means for transmitting said requested data in said cache memory, to said transmission request source through said radio channel, when the registration of the requested data in said cache memory has been detected by said search means.

9. A data communication method for a radio communication system wherein the transmission apparatus communicates with a reception apparatus through a radio channel, said method comprising:

monitoring whether or not a transmission request for data, designating the transmission apparatus itself as a transmission destination, has been issued by said transmission apparatus or the reception apparatus connected thereto through a network;

generating and initiating a process in the transmission apparatus to serve as a logical reception destination for the data and also generating a buffer in correspondence with the process, when the issue of the transmission request has detected;

transferring the data from a transmission request source to said process in accordance with communications of an internal virtual circuit type, so as to store in the buffer the data transmitted by the transmission request source; and transmitting the data stored in said buffer, to said reception apparatus through the radio channel;

wherein when a plurality of such buffers have been generated in said generating operates to read out data successively from the buffers of higher priority levels in accordance with priority levels set for the respective buffers, and to transmit the read data, in said transmitting.

10. A data communication method for a radio communication system as defined in claim 9, further comprising:

detecting a data storing state of said buffer; and wherein in said transferring, a communication speed of the virtual circuit type communications is controlled in accordance with a result of the detection.

11. A data communication method for a radio communication system wherein the transmission apparatus communicates with a reception apparatus through a radio channel, said method comprising:

monitoring whether or not a transmission request for data, designating the transmission apparatus itself as a transmission destination, has been issued by said transmission apparatus or the reception apparatus connected thereto through a network;

generating and initiating a process in the transmission apparatus to serve as a logical reception destination for the data and also generating a buffer in correspondence with the process, when the issue of the transmission request has detected;

transferring the data from a transmission request source to said process in accordance with communications of an internal virtual circuit type, so as to store in the buffer the data transmitted by the transmission request source; and transmitting the data stored in said buffer, to said reception apparatus through the radio channel;

wherein when a plurality of such buffers have been generated in said generating operates to transmit data stored in the respective buffers while setting transmission cycles of the data stored in said buffers of higher priority levels, shorter in accordance with priority levels set for said respective buffers, in said transmitting.

12. A data communication method for a radio communication system wherein a transmission apparatus communicates with a reception apparatus through a radio channel, said method comprising:

monitoring whether or not a transmission request for data, designating the transmission apparatus itself as a transmission destination, has been issued by the transmission apparatus or the reception apparatus connected thereto through a network;

generating and initiating a process in the transmission apparatus to serve as a logical reception destination for the data and also generating a buffer in correspondence with the process, when the issue of the transmission request has detected;

transferring the data from a transmission request source to said process in accordance with communications of an internal virtual circuit type, so as to store in the buffer the data transmitted by the transmission request source;

transmitting the data stored in said buffer, to said reception apparatus through the radio channel storing data sent back in response to the data transmission said transmission in a cache memory;

making a search as to whether data requested by said transmission request source is stored in the cache memory; and reading the requested data out of said cache memory and transmitting the read data to said transmission request source, when the data requested by said transmission request source is stored in the cache memory.

13. A data communication method for a radio communication system wherein the reception apparatus communicates with a transmission apparatus through a radio channel, comprising:

receiving data sent in through the radio channel;

monitoring whether or not the received data conforms to a protocol suspended in layers of said radio channel;

generating and initiating a process in the reception apparatus to serve as a logical reception destination for the data, when the reception of the data conforming to the protocol has been detected;

transferring the data received by the process, to a transmission request destination in accordance with communications of an internal virtual circuit type;

storing data sent back from the transmission request destination in response to the data transfer, in a cache memory;

making a search as to whether or not data requested by the data received through said radio channel is registered in the cache memory; and transmitting the requested data in said cache memory, to said transmission request source through said radio channel when said requested data is registered in said cache memory.

14. A transmission apparatus for use in a radio communication system wherein the transmission apparatus communicates with a reception apparatus through a radio channel, said transmission apparatus comprising:

monitoring means for monitoring whether or not a transmission request for data, designating the transmission apparatus itself as a transmission destination, has been issued by said transmission apparatus or the reception apparatus connected thereto through a network;

generation means for generating and initiating a process in the transmission apparatus to serve as a logical reception destination for the data and generating a buffer in correspondence with the process, when said monitoring means has detected the issue of the transmission request;

transfer means for transferring the data from a transmission request source to said process in accordance with communications of an internal virtual circuit type, so as to store in the buffer the data transmitted by the transmission request source;

transmission means for transmitting the data stored in said buffer, to said reception apparatus through the radio channel; and detection means for detecting a data storing state of said buffer;

wherein said transfer means controls a communication speed of the internal virtual circuit type communications in accordance with a detected result of said detection means; and wherein when a plurality of such buffers are generated by said generation means, said transmission means transmits data while setting transmission cycles of the data stored in the buffers of higher priority levels, shorter in accordance with priority levels set for the respective buffers.

15. A transmission apparatus for use in a radio communication system wherein the transmission apparatus communicates with a reception apparatus through a radio channel, said transmission apparatus comprising:

monitoring means for monitoring whether or not a transmission request for data, designating the transmission apparatus itself as a transmission destination, has been issued by said transmission apparatus or the reception apparatus connected thereto through a network;

generation means for generating and initiating a process in the transmission apparatus to serve as a logical reception destination for the data and generating a buffer in correspondence with the process, when said monitoring means has detected the issue of the transmission request;

transfer means for transferring the data from a transmission request source to said process in accordance with communications of an internal virtual circuit type, so as to store in the buffer the data transmitted by the transmission request source;

transmission means for transmitting the data stored in said buffer, to said reception apparatus through the radio channel;

detection means for detecting a data storing state of said buffer;

a cache memory which stores therein data sent back in response to the data transmission of said transmission means; and search means for searching as to whether or not data requested by said transmission request source is registered in said cache memory;

wherein said transfer means controls a communication speed of the internal virtual circuit type communications in accordance with a detected result of said detection means; and wherein when the registration of the requested data in said cache memory has been detected by said search means, said process transfers said requested data in said cache memory, to said transmission request source through said transfer means.

16. A transmission apparatus for use in a radio communication system wherein the transmission apparatus communicates with a reception apparatus through a radio channel, said transmission apparatus comprising:

monitoring means for monitoring whether or not a transmission request for data, designating the transmission apparatus itself as a transmission destination, has been issued by said transmission apparatus or the reception apparatus connected thereto through a network;

generation means for generating and initiating a process in the transmission apparatus to serve as a logical reception destination for the data and generating a buffer in correspondence with the process, when said monitoring means has detected the issue of the transmission request;

transfer means for transferring the data from a transmission request source to said process in accordance with communications of an internal virtual circuit type, so as to store in the buffer the data transmitted by the transmission request source;

transmission means for transmitting the data stored in said buffer, to said reception apparatus through the radio channel; and detection means for detecting a data storing state of said buffer;

wherein said transmission means transmits transmission destination information to be designated, in accordance with a protocol of an upper layer with respect to layers of said radio channel, wherein said transfer means controls a communication speed of the virtual circuit type communications in accordance with a detected result of said detection means, and wherein when a plurality of such buffers are generated by said generation means, said transmission means transmits data while setting transmission cycles of the data stored in the buffers of higher priority levels, shorter in accordance with priority levels set for the respective buffers.

17. A transmission apparatus for use in a radio communication system wherein the transmission apparatus communicates with a reception apparatus through a radio channel, said transmission apparatus comprising:

monitoring means for monitoring whether or not a transmission request for data, designating the transmission apparatus itself as a transmission destination, has been issued by said transmission apparatus or the reception apparatus connected thereto through a network;

generation means for generating and initiating a process in the transmission apparatus to serve as a logical reception destination for the data and generating a buffer in correspondence with the process, when said monitoring means has detected the issue of the transmission request;

transfer means for transferring the data from a transmission request source to said process in accordance with communications of an internal virtual circuit type, so as to store in the buffer the data transmitted by the transmission request source;

transmission means for transmitting the data stored in said buffer, to said reception apparatus through the radio channel;

detection means for detecting a data storing state of said buffer;

a cache memory which stores therein data sent back in response to the data transmission of said transmission means; and wherein said transmission means transmits transmission destination information to be designated, in accordance with a protocol of an upper layer with respect to layers of said radio channel;

wherein said transfer means controls a communication speed of the virtual circuit type communications in accordance with a detected result of said detection means, search means for searching as to whether or not data requested by said transmission request source is registered in said cache memory; and wherein when the registration of the requested data in said cache memory has been detected by said search means, said process transfers said requested data in said cache memory, to said transmission request source through said transfer means.

18. A data communication method for a radio communication system wherein a transmission apparatus communicates with a reception apparatus through a radio channel, said method comprising:

monitoring whether or not a transmission request for data, designating the transmission apparatus itself as a transmission destination, has been issued by said transmission apparatus or the reception apparatus connected thereto through a network;

generating and initiating a process in the transmission apparatus to serve as a logical reception destination for the data and also generating a buffer in correspondence with the process, when the issue of the transmission request has detected;

transferring the data from a transmission request source to said process in accordance with communications of an internal virtual circuit type, so as to store in the buffer the data transmitted by the transmission request source;

transmitting the data stored in said buffer, to said reception apparatus through the radio channel; and detecting a data storing state of said buffer;

wherein in said transferring, a communication speed of the virtual circuit type communications is controlled in accordance with a result of the detection, and wherein when a plurality of such buffers have been generated in said generating operates to read out data successively from the buffers of higher priority levels in accordance with priority levels set for the respective buffers, and to transmit the read data, in said transmitting.

19. A data communication method for a radio communication system wherein a transmission apparatus communicates with a reception apparatus through a radio channel, said method comprising:

monitoring whether or not a transmission request for data, designating the transmission apparatus itself as a transmission destination, has been issued by said transmission apparatus or the reception apparatus connected thereto through a network;

generating and initiating a process in the transmission apparatus to serve as a logical reception destination for the data and also generating a buffer in correspondence with the process, when the issue of the transmission request has detected;

transferring the data from a transmission request source to said process in accordance with communications of an internal virtual circuit type, so as to store in the buffer the data transmitted by the transmission request source;

transmitting the data stored in said buffer, to said reception apparatus through the radio channel;

detecting a data storing state of said buffer and wherein in said transferring, a communication speed of the virtual circuit type communications is controlled in accordance with a result of the detection, storing data sent back in response to the data transmission said transmission in a cache memory;

making a search as to whether data requested by said transmission request source is stored in the cache memory; and reading the requested data out of said cache memory and transmitting the read data to said transmission request source, when the data requested by said transmission request source is stored in the cache memory.

* * * * *